United States Patent
Seymour et al.

(10) Patent No.: US 9,763,276 B2
(45) Date of Patent: Sep. 12, 2017

(54) SEAMLESS CONNECTIVITY BETWEEN HEARING AID AND MULTIPLE DEVICES

(71) Applicant: Apple Inc., Cupertino, CA (US)

(72) Inventors: Eric T. Seymour, San Jose, CA (US); Christopher B. Fleizach, Morgan Hill, CA (US); Ian M. Fisch, Santa Cruz, CA (US); Joakim Linde, Cupertino, CA (US); Edwin Foo, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/503,186

(22) Filed: Sep. 30, 2014

(65) Prior Publication Data

US 2015/0351143 A1 Dec. 3, 2015

Related U.S. Application Data

(60) Provisional application No. 62/005,995, filed on May 30, 2014.

(51) Int. Cl.
*H04W 76/02* (2009.01)
*H04M 1/725* (2006.01)
(Continued)

(52) U.S. Cl.
CPC ....... *H04W 76/023* (2013.01); *H04M 1/7253* (2013.01); *H04M 1/72519* (2013.01); *H04R 25/554* (2013.01); *H04W 4/008* (2013.01); *H04R 2225/55* (2013.01); *H04W 84/20* (2013.01)

(58) Field of Classification Search
CPC ............................. H04R 2225/55; H04R 25/00
See application file for complete search history.

(56) References Cited

U.S. PATENT DOCUMENTS

| | | | |
|---|---|---|---|
| 8,019,272 B2* | 9/2011 | Masuda | H04H 20/61 455/3.01 |
| 2003/0064746 A1* | 4/2003 | Rader | H04R 25/70 455/550.1 |

(Continued)

OTHER PUBLICATIONS

Office Action, dated Nov. 24, 2015, received in U.S. Appl. No. 14/503,184, 13 pages.

(Continued)

*Primary Examiner* — Devan Sandiford
(74) *Attorney, Agent, or Firm* — Morgan, Lewis & Bockius LLP

(57) ABSTRACT

A method for controlling a peripheral from a group of computing devices is provided. The method sets up a group of computing devices for providing media content and control settings to a peripheral device such as a hearing aid. The computing devices in the group are interconnected by a network and exchange data with each other regarding the peripheral. A master device in the group is directly paired with the peripheral device and can use the pairing connection to provide media content or to apply the control settings to the peripheral device. The peripheral device is paired with only the master devices of the group. A slave device can request to directly pair with the peripheral device and become the master device in order to provide media content to the peripheral.

31 Claims, 22 Drawing Sheets

(51) Int. Cl.
*H04W 4/00* (2009.01)
*H04R 25/00* (2006.01)
*H04W 84/20* (2009.01)

(56) References Cited

U.S. PATENT DOCUMENTS

| | | | | |
|---|---|---|---|---|
| 2003/0223604 | A1* | 12/2003 | Nakagawa | H04M 1/6066 381/311 |
| 2004/0063452 | A1* | 4/2004 | Tomoda | H04M 1/57 455/519 |
| 2006/0173974 | A1* | 8/2006 | Tang | H04L 63/029 709/217 |
| 2007/0140187 | A1* | 6/2007 | Rokusek | H04L 67/16 370/338 |
| 2007/0206829 | A1* | 9/2007 | Weinans | H04M 1/6066 381/370 |
| 2008/0146265 | A1* | 6/2008 | Valavi | G06F 1/1626 455/550.1 |
| 2009/0233590 | A1* | 9/2009 | Sinton | H04B 1/034 455/418 |
| 2010/0190440 | A1* | 7/2010 | Kim | H04M 1/7253 455/41.2 |
| 2010/0195539 | A1* | 8/2010 | Tian | H04L 47/824 370/255 |
| 2010/0208922 | A1* | 8/2010 | Erni | H04R 25/554 381/315 |
| 2010/0254540 | A1* | 10/2010 | Bang | H04M 1/6016 381/60 |
| 2011/0151788 | A1* | 6/2011 | Castrogiovanni | H04W 76/043 455/41.2 |
| 2011/0300840 | A1* | 12/2011 | Basir | G10L 15/265 455/416 |
| 2012/0148080 | A1* | 6/2012 | Kushnirov | A42B 3/30 381/333 |
| 2013/0072119 | A1* | 3/2013 | Park | H04W 8/005 455/41.2 |
| 2013/0147612 | A1* | 6/2013 | Hong | G08C 19/00 340/12.54 |
| 2013/0311692 | A1 | 11/2013 | Huang et al. | |
| 2013/0314214 | A1* | 11/2013 | Leica | H04W 4/008 340/10.1 |
| 2013/0314334 | A1* | 11/2013 | Leica | H04B 5/0031 345/173 |
| 2013/0343584 | A1* | 12/2013 | Bennett | H04R 25/554 381/315 |
| 2013/0343585 | A1* | 12/2013 | Bennett | H04R 25/554 381/315 |
| 2014/0029913 | A1* | 1/2014 | Lopez | H04N 21/42208 386/230 |
| 2014/0033056 | A1* | 1/2014 | Kim | G06F 3/0484 715/738 |
| 2014/0079248 | A1* | 3/2014 | Short | G10L 21/0272 381/119 |
| 2014/0094124 | A1 | 4/2014 | Dave et al. | |
| 2014/0317242 | A1* | 10/2014 | Koo | H04W 4/001 709/219 |
| 2014/0351477 | A1 | 11/2014 | Lee et al. | |
| 2015/0016417 | A1 | 1/2015 | Dees et al. | |
| 2015/0056920 | A1 | 2/2015 | Huttunen et al. | |
| 2015/0139459 | A1* | 5/2015 | Olsen | H04R 1/1091 381/315 |
| 2015/0149679 | A1 | 5/2015 | Mostafa et al. | |
| 2015/0189006 | A1* | 7/2015 | Smus | H04L 67/104 709/204 |
| 2015/0312705 | A1* | 10/2015 | Pan | H04M 1/72527 455/41.2 |
| 2015/0351142 | A1 | 12/2015 | Seymour et al. | |
| 2015/0365817 | A1* | 12/2015 | Chu | H04W 8/183 455/41.2 |
| 2016/0197934 | A1* | 7/2016 | Muraoka | H04L 63/104 726/7 |
| 2016/0334837 | A1 | 11/2016 | Dees et al. | |
| 2016/0337457 | A1 | 11/2016 | Kim et al. | |
| 2016/0360341 | A1* | 12/2016 | Srivatsa | H04L 67/104 |

OTHER PUBLICATIONS

Final Office Action, dated Apr. 8, 2016, received in U.S. Appl. No. 14/503,184, 10 pages.

Office Action (Interview Summary), dated Aug. 22, 2016, received in U.S. Appl. No. 14/503,184, 5 pages.

Office Action, dated Dec. 2, 2016, received in U.S. Appl. No. 14/503,184, received in U.S. Appl. No. 14/503,184, 10 pages.

Notice of Allowance, dated May 5, 2017, received in U.S. Appl. No. 14/503,184 (7232), 7 pages.

* cited by examiner

SEAMLESS CONNECTIVITY BETWEEN HEARING AID AND MULTIPLE DEVICES

CLAIM OF BENEFIT TO PRIOR APPLICATIONS

This present Application claims the benefit of U.S. Provisional Patent Application 62/005,995, filed May 30, 2014. U.S. Provisional Patent Applications 62/005,995 is incorporated herein by reference.

BACKGROUND

Hearing aid is a body-worn device that is highly customized according to individual user's preferences and characteristics, often as specifically prescribed by the user's physicians. Hearing aid settings have to be adjusted in real time as the user experiences different audio environments. It is therefore important for a hearing aid user to be able to easily control the settings of his hearing aid. However, to control most hearing aids, users have to either fumble through the small buttons on the hearing aids themselves, or carry a separate device specifically for controlling the hearing aid. This makes the control of the hearing aid rather cumbersome for most users.

SUMMARY

Rapid advances in technology have created personal computing devices with ever greater computing power in ever smaller sizes. Many of these personal computing devices are compact enough to be worn by users. They are also powerful enough to perform the functions of other body-worn devices such as watches, phones, cameras, and media players. This allows those other bulky body-worn devices to be replaced, their functionalities integrated into one general purpose body-worn device such as a mobile phone. One of those body-worn devices that can be integrated into the general purpose device is hearing aid. The user of the general purpose body-worn device often also owns multiple computing devices such as mobile phones, tablet, laptops, and desktops, which are often interlinked by a network and have access to computing cloud. Having many different devices communicate with the hearing aid opens up many opportunities for enhancing the user's experience of the hearing aid. There is therefore a need for a method or system that allows a user of a hearing aid to seamlessly control and use the hearing aid from his many different devices.

Some embodiments of the invention provides a method of setting up a group of computing devices for providing media content and control settings to the peripheral device. In some embodiments, the computing devices in the group are interconnected by a network, while the peripheral device has a direct connection that pairs it with one of the devices in the group. The computing devices in the group exchange data regarding the peripheral device over the network. In some embodiments, the computing device that is paired with the peripheral device is referred to as a master device, while the remaining computing devices in the group that are not directly connected with the peripheral device are referred to as slave devices. The master device uses the direct pairing connection to provide media content and apply control settings to the peripheral device. In some embodiments, a slave device can request to directly pair with the peripheral device and becomes the group's master while the former master becomes one of the slaves.

In some embodiments, computing devices that are interested in connecting with a peripheral device forms a peripheral group. The peripheral group is formed by an advertisement process that allows devices in a network that are interested in a peripheral device to identify each other and to form a group for controlling the peripheral device. In some embodiments, such an advertisement process starts when one or more host devices start to advertise themselves as being interested in the peripheral device. When one of these host devices has initially formed a pairing connection with the peripheral device, it announces itself to be the master of a group that includes all the devices that have advertised for the peripheral device over the network.

In some embodiments, information used by a host device to pair with a peripheral device is reused by another host device to pair with the same peripheral device. The pairing information in some embodiments includes information for identifying the peripheral. A host device having the pairing information for a peripheral device is able to use the peripheral's identifying information (e.g., the peripherals ID or address) to pair with the peripheral. In some embodiments, the pairing information is provided by another host device in the peripheral group over the network. In some embodiments, the pairing information is stored in a computing cloud, and the host device retrieves the information as part of the account information or profile for the user. In some embodiments, the pairing information for a peripheral device is stored locally at a host device. In some embodiments the pairing information is generated and stored when a host device belonging to the user of the peripheral had earlier performed discovery or inquiry operation and learned the identifying information of the peripheral device. Once generated and stored, the pairing information becomes reusable by any host device belonging to the same user.

In some embodiments, the pairing information of a particular peripheral device is used by multiple different host devices at different points in time to pair with the peripheral device. The pairing information includes information for identifying the peripheral device so a host device having the pairing information can proceed to pair with the peripheral device without having to perform discovery or inquiry first.

In some embodiments, the pairing information for a peripheral device, once generated, is stored and made available to host devices that need to connect to the peripheral device. In some embodiments, the pairing information of a peripheral belonging to a user is stored in storage locations that are assigned to the user. In some embodiments, all active host devices (e.g., mobile phones, tablets, laptops, desktops, etc.) of the user have access to those storage locations and are able to retrieve the pairing information of the particular peripheral device. In some embodiments, such storage locations are in a computing cloud so any device belonging to a particular user may retrieve user specific information from the cloud (by e.g., logging into the user's account), including information for his peripheral device.

In some embodiments, in order to provide media content to the peripheral device from the slave, the slave device would send a request to the master through a network or communications medium that it shares with the master. The master device in turn decides whether to accept or deny the request. In some embodiments, the decision is based on an examination of the priority of the media content that the slave device is requesting to provide. If the master decides to accept the request, it breaks its paired connection with the peripheral device. The slave device in turn uses the pairing information or its own connection record from a previous pairing with the peripheral to pair with the peripheral device.

In some embodiments, each host devices in a peripheral group is allowed to adjust control settings to the peripheral. A slave device adjusting the control settings of the peripheral can do so remotely without being directly paired with the peripheral device. In some embodiments, any adjustment to the control setting will be propagated to all devices in the group in order to keep the control settings of the peripheral synchronized across group. In some embodiments, the control settings are displayed as GUI items that the user may manipulate. In some of these embodiments, as the adjustments to the settings are remotely synchronized across the network, the GUI displays of the control settings in different host devices are also synchronized.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provides a method of setting up a group of computing devices for providing media content to a peripheral device and control settings of the peripheral device. In some embodiments, the computing devices in the group are interconnected by a network, while the peripheral device has a direct connection that pairs it with one of the devices in the group. In some embodiments, the computing device that is paired with the peripheral device is referred to as a master device, while the remaining computing devices in the group that are not directly connected with the peripheral device are referred to as slave devices. The master device uses the direct pairing connection to provide media content to the peripheral device and to apply the control settings to the peripheral device while the slave devices exchanges data with the master device regarding the peripheral device. In some embodiments, a slave device can request to directly pair with the peripheral device and becomes the group's master while the former master becomes one of the slaves.

Figure 1:
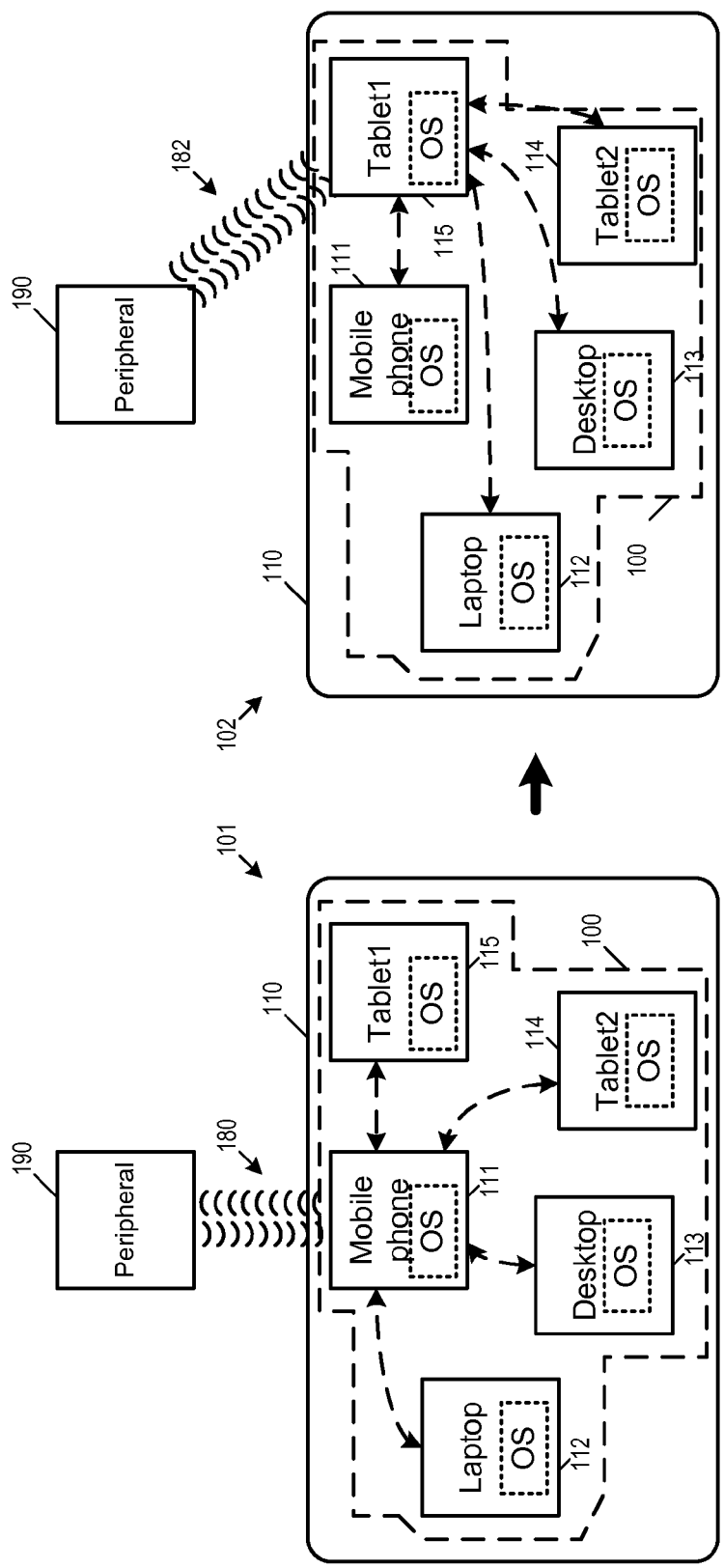
FIG. 1 illustrates a group of computing devices for providing media content to a peripheral device and for controlling the settings of the peripheral device.

For some embodiments, FIG. 1 illustrates a group of computing devices 100 for providing media content to a peripheral device 190 and for controlling the settings of the peripheral device 190. The group of devices 100 includes computing devices 111-115 that are interlinked by a network 110. The peripheral device 190 receives media content and control settings from a direct pairing connection with one of the computing devices in the group 100. One of the computing devices in the group 100 is the master of the group. This master device is in charge of the direct pairing connection and provides the media content and control settings to the peripheral device through the direct pairing connection.

FIG. 1 illustrates two example configurations 101 and 102. In the configuration 101, the mobile phone 111 is the master device paired with the peripheral 190 and in charge of the direct pairing connection 180. The laptop 112, the desktop 113, the tablet 114, and the tablet 115 must all first communicate with the mobile phone 111 in order to apply control setting or to provide media content to the peripheral 190. On the other hand, in the configuration 102, the tablet 115 is the master device paired with the peripheral 190 through a direct pairing connection 182. The devices 111-114 have to first communicate with the tablet 115 in order to apply control setting or to provide media content to the peripheral 190 through the direct pairing connection 182.

Each of the host devices 111-115 is capable of establishing a direct paired connection with the peripheral 190. However, in some embodiments, the peripheral 190 can have only one direct paired connection with only one device (i.e., the master device). Thus, in some embodiments, a slave device that needs to deliver media content to the peripheral device would request the master for the direct pairing connection. Once the master relinquishes its pairing connection (e.g., 180) with the peripheral 190, the slave device can establish its own direct pairing connection (e.g., 182) with the peripheral 190 and become the master of the group 100. The former master would then become a slave in some of these embodiments.

The devices 111-115 in the group 100 are computing or communications devices capable of serving as host devices for the peripheral 190. They are referred to as host devices or host computing devices in some embodiments because each of these computing devices is a potential host for the peripheral device in order to provide media content and manage control settings to the peripheral device. Such a group of host devices may include different types of computing or communication devices, such as mobile phones (or smart phones), PDAs, tablet computers, or other mobile computing devices. Such group of devices may also include laptop computers, desktop computers, workstations, or other types of portable or stationary computing devices. As illustrated, the host device 111 is a mobile phone 111, the host device 112 is a laptop computer, the host device 113 is a desktop computer, and the host devices 114 and 115 are both tablet computers. Each of these host devices is a computing device capable of running a computer operating system that supports the operations of the peripheral 190, and at least some of these devices support a graphical user interface (GUI) for receiving user command and inputs for purposes such as adjusting the settings to the peripheral 190.

In some embodiments, each of host devices 111-115 is also a communications device capable of exchanging data with each other over the network 110. In some embodiments, such a network is a network established over a wireless medium such as WiFi (802.11). In some embodiments, the network interconnecting the group of devices for the peripheral is a network established over a wired medium such as Ethernet, Power Line, or Home Phone Network (HPNA). In some embodiments, the network 110 allows each host device to maintain connections with multiple other host devices in the network at the same time. In some embodiments, the network spans multiple different types of network mediums and topologies, including both wireless and wired mediums. The host devices in the group 100 exchange data related to the peripheral 190 with each other over the network 110. In some embodiments, such data includes adjustments for control settings in the peripheral. In some embodiments, such data includes requests for pairing with the peripheral. In some embodiments, such data includes pairing records for accelerating pairing process with the peripheral 190.

Each host device in the group 100 is running software modules that enable the host device to pair with the peripheral device 190 and to use the network 110 to communicate with other devices in the group 100 about the peripheral device 190. In some embodiments, such software modules are part of the operating system ("OS") operating in each of the host devices. The software components enabling a host device to pair with the peripheral device and to communicate with other host devices in the group will be further described below by reference to FIG. 18.

The peripheral device 190 is a device that is connected to a host computing device for expanding the capabilities of the host computing device, specifically to provide output to the user from the host computing device. In some embodiments, the peripheral device is an audio headset. In some embodiments, the peripheral is a hearing aid or other types of body-worn devices. The setting of the peripheral device is supplied by the master device of the group 100 over the direct pairing connection. In some embodiments, the peripheral 190 provides audio to the user based on the control setting provided by the master device. In some embodiments, the peripheral 190 also plays media content (e.g., audio) provided by the master device to the user.

A direct pairing connection (180 or 182) is a wireless connection that pairs the peripheral 190 with the master device of the group 100 of devices. As mentioned, the control settings for the peripheral as well as media content to the peripheral are both delivered to the peripheral 190 through the direct pairing connection. Unlike the communications connections in the network 110, the direct pairing connection allows only one active connection to the peripheral 190 at one time. In some embodiments, the direct pairing connection is based on a wireless connection standard such as Bluetooth. In some embodiments, the wireless direct pairing connection is a lower bandwidth connection than the connections in the network 110. In some embodiments, the wireless direct pairing connection is a lower power wireless connection than the wireless connections in the network 110. For example, the Bluetooth connection 180 (or 182) is a lower powered/lower throughput connection than WiFi connection 110. Lower powered wireless connection allows the peripheral device to have longer battery life. Furthermore, for body-worn devices such as hearing aids and headsets, lower powered radio emission is preferred by many users.

The direct pairing connection 180 (or 182) allows the master device 111 (or 115) to provide different types of data to the peripheral 190. For example, some embodiments use the connection 180 to provide environment-specific control settings (e.g., audio equalization settings) to the hearing aid 190. Some embodiments use the connection 180 to provide audio content to the headset or hearing aid 190, audio content such as from voice call, video call, media playback, system notification, remote microphone or other types of audio content.

Several more detailed embodiments of the invention are described below. Section I describes the formation of a group of devices for providing media content and control settings to a peripheral device. Section II describes the automatic pairing with a peripheral device by reusing pairing information for the peripheral device. Section III describes a master device relinquishing the paired connection in favor a slave device that requests to be paired with the peripheral device. Section IV describes synchronization and remote adjustment of control settings to the peripheral device. Section V describes an example computing device that implements some embodiments of the invention. Finally, section VI describes an electronic system with which some embodiments of the invention are implemented.

I. Formation of a Peripheral Group

The devices in the group 100 are identified as a group because they are computing or communications devices "interested" in a particular peripheral device. One can refer to such as a group of (potential) host devices as a peripheral group or a group for a peripheral device. In some embodiments, a peripheral group is a group of different devices belonging to a particular user who would like to use his multiple different devices to either control his peripheral or to provide media content to his peripheral. In some embodiments, host devices identified as belonging to the particular user are the ones that have been authenticated on a user account that belong to the particular user.

In some embodiments in which the peripheral device is a hearing aid, the devices joining the group are "interested" in the hearing aid because they all belong to the same hearing aid user who would like to control his hearing aid or to send audio to his hearing aid from several different host devices. In some embodiments, host devices that had previously paired with the peripheral are the ones that are "interested" in connecting with the peripheral.

In some embodiments, such a group of devices is formed by an advertisement process that allows devices in a network that are interested in a peripheral device to identify each other and to form a group for controlling the peripheral device. In some embodiments, such an advertisement process starts when one or more host devices start to advertise themselves as being interested in the peripheral device. When one of these host devices has initially formed a pairing connection with the peripheral device, it announces itself to be the master of a group that includes all the devices that have advertised for the peripheral device over the network.

Figure 2:
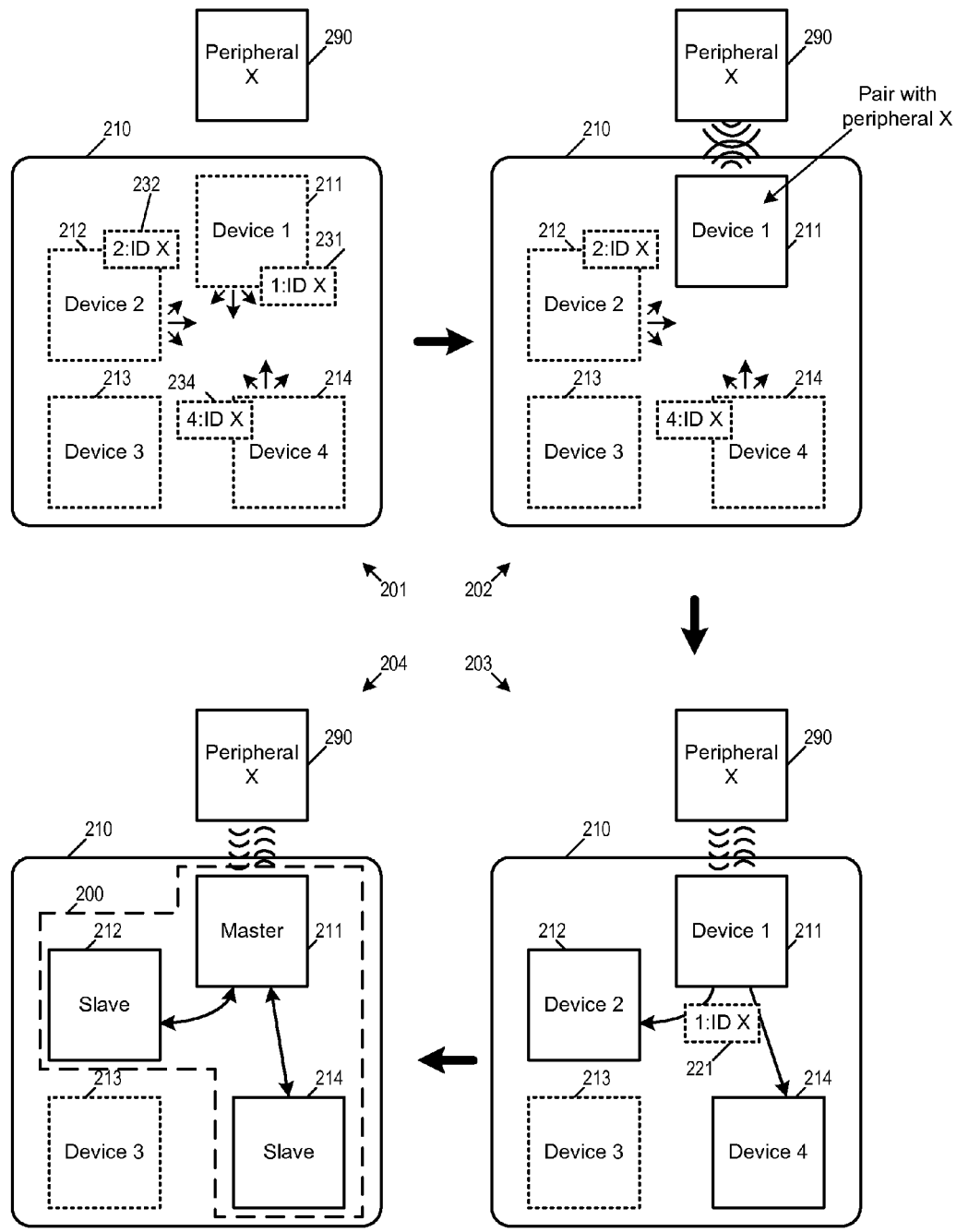
FIG. 2 illustrates the formation of a group of devices for controlling and for providing data to a peripheral device.

FIG. 2 illustrates the formation of a group 200 of devices for controlling and for providing data to a peripheral device 290. The group 200 will be formed by devices in a network 210, which interconnects several computing or communications devices that includes 211-214. Prior to the formation of the group, it is unknown which of the devices in the network 210 is interested in the peripheral device 290 and therefore should be included the group 200.

FIG. 2 illustrates the formation of the group 200 in four stages 201-204. At the first stage 201, None of the host devices 211-214 is connected to the peripheral 290. Devices 211-214 are illustrated in dashed lines at the stage 201 to indicate that it is unknown whether any of the devices 212-214 is interested in the peripheral device 290. However, the host devices 211, 212, and 214 advertises on the network 210 (by sending advertisement 231, 232 and 234, respectively) that they are interested in the peripheral device 290. In some embodiments, such an advertisement process is performed by zero-configuration networking protocols such as Bonjour® in order to discover services on a local area network. The information advertised includes information that identifies the peripheral device. For example, a hearing aid in some embodiments has a unique ID (some embodiments has an ID for the right ear and another ID for the left ear), and the hearing ID is provided as part of the advertisement.

The advertisement also identifies the advertising host device. The advertisement therefore allows the host devices that are interested in the peripheral 290 to identify each other and form the group 200. For example, if the peripheral device 290 is a hearing aid, then the user of the hearing aid may set up some or all of his devices (desktops, laptops, mobile phones, and tablets) to support the use of his hearing aid. The information advertised by the devices 211, 212 and 214 would identify the advertised peripheral as being a hearing aid, along with other related information. The devices that receive the advertisement would recognize the advertised peripheral device as being the user's hearing aid and identify the sender of the advertisement as a device in the group of host devices for the hearing aid.

At second stage 202, the device 211 is in the process of connecting with the peripheral device 290. This connection process may require negotiation between the peripheral and the host device in order to pair if the host device 211 has not previously paired with the peripheral 290. This process may further require discovery/inquiry of information regarding the peripheral 290 if the host device 211 does not have the requisite information for pairing with the peripheral 290.

At the third stage 203, the device 211 has established a direct pairing connection with the peripheral device 290 and begins to announce itself as the master of the peripheral group 200 for the peripheral 290. In some embodiments, the device 211 keeps track of the advertisement that were sent over the network 210 and uses those information to identify or find those other devices that are also interested in connecting with the peripheral 290 (i.e., the devices 212 and 214). As illustrated, the 211 is sending a message 221 to those other devices to announce that it is the master of the peripheral group.

At the fourth stage 204, the devices 211, 212, and 214 have formed a group (i.e., the group 200) for providing media content and control settings to the peripheral device 290. Since the device 211 currently has the direct pairing connection with the peripheral device, it is therefore the master device of the group. The devices 212 and 214 are set up as slave devices of the group 200 (until one of them requests to become the master). The devices 211, 212, and 214 henceforth communicate with each other in order to exchange data and control regarding the peripheral device 290. The device 213, though interconnected by the network 210, is not a device that is interested in the peripheral 290 and therefore does not participate in the group 200 and would not exchange data related to the peripheral 290 with devices 211, 212, and 214.

Figure 3:
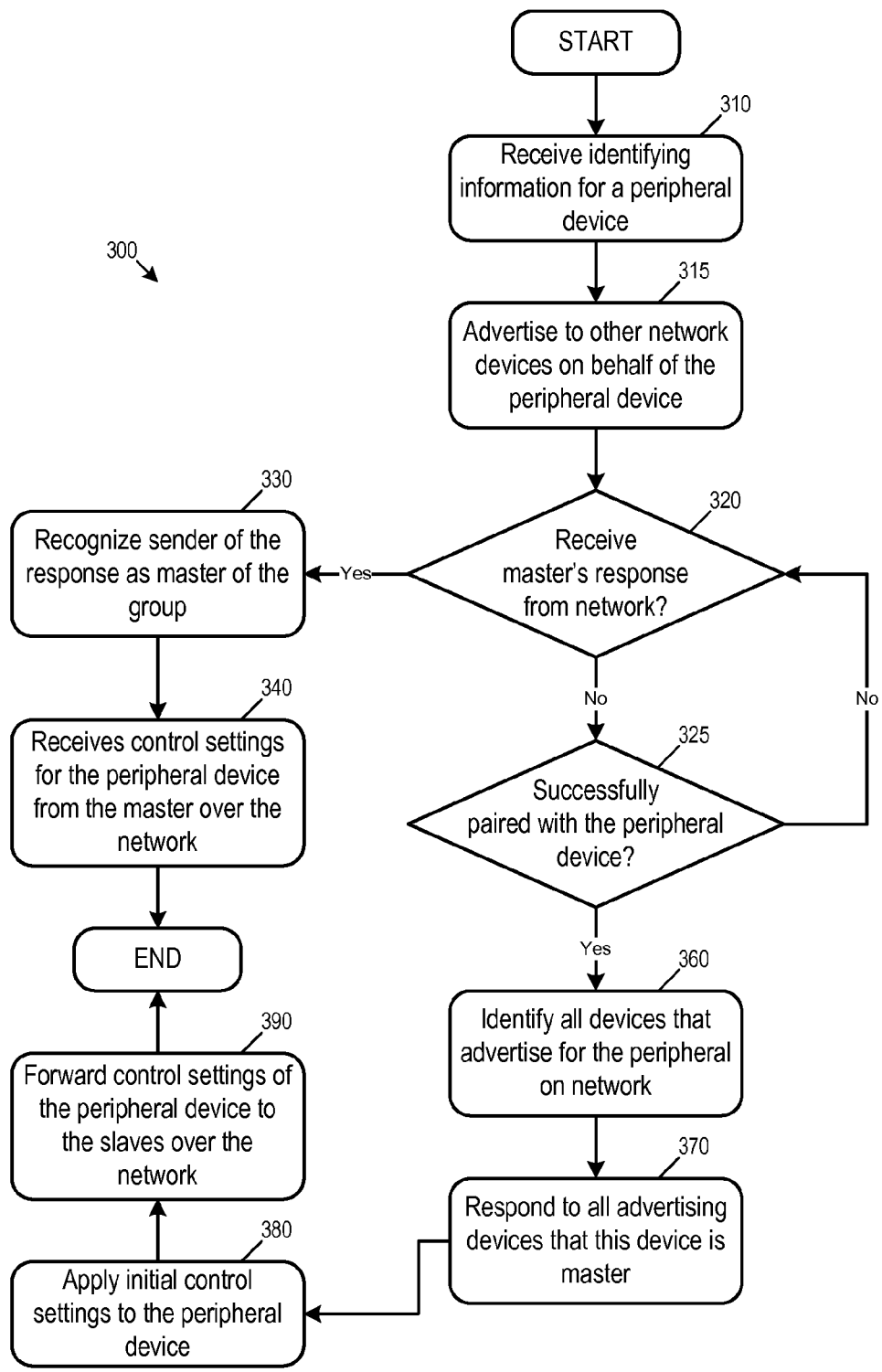
FIG. 3 conceptually illustrates a process for forming a group of host devices for providing media content or control settings to a peripheral.

FIG. 3 conceptually illustrates a process 300 for forming a group of host devices for providing media content or control settings to a peripheral device. Specifically, the process 300 is performed by a host device when the host device pairs with the peripheral and becomes the master (such as the host devices 211) of the group, or responds to an advertisement for the peripheral device and becomes a slave (such as the host devices 212 and 214).

The process 300 starts when the host device receives (at 310) identifying information for a peripheral device. The identifying information allows the host device to find the peripheral device and to pair with it. In some embodiments, the identifying information is generated when a host device, either this host device or another host device, discovers the peripheral and pairs with it. The generated information is then stored and made available for later pairing with the peripheral by the same host device or another host device. The process 300 at the operation 310 then receives this previously generated identifying information for the peripheral device.

Next, the process advertises (at 315) information about the peripheral device in a network. At this operation of the process 300, the host device running the process has not connected with the peripheral device and can still be a slave of the group. The process device sends messages to other devices that are communicatively linked with this device (e.g., by the network) advertising the peripheral device to let other identify this device as a device that is interested in connecting with the peripheral device.

The process then determines (at 320) whether it has received a response to the advertisement (e.g., the message 221 from the host device 211 announcing itself to be the master of the group). Receiving a response to the advertisement for the peripheral is an indication that another host device in the network has already successfully paired with the peripheral and becomes the master. Conversely, not having received a response for the advertisement is an indication that no other device has paired with the peripheral so host device executing the process may still become the master. If the process 300 has received a response for the advertisement message, it proceeds to 330 to become a slave. If the process has not received a response to the advertisement message, the process proceeds to 325.

At 325, the process determines whether it has successfully paired with the peripheral device. During operations 320 and 325, the process tries to pair with the peripheral device. If the pairing is successful, the process proceeds to 360 to become the master of the group of devices. If the process has not yet successfully paired with the peripheral device, it returns to 320 to see if it has received a response to the advertisement for the peripheral device.

At 330, the process recognizes the device that responded to the advertisement for the peripheral device as the master of the group. In some embodiments, this allows the device executing the process 300 to know who is the master and to whom should request for pairing with the peripheral be sent. The process then receives (at 340) control settings for the peripheral device from the master. The master is applying this control setting to the peripheral device. The control setting is relayed to this device (now a slave) so it can remotely change the control setting to the peripheral device. After receiving the control settings for the peripheral device, the process 300 ends.

At 360, the process identifies all devices that have sent advertisement over the network for the peripheral device. The process then responds (at 370) to the advertising devices so they know the device performing this process has successfully paired with the peripheral device and is the master of the group. The process applies (at 380) control settings to the connected peripheral device through the direct pairing connection, since the device performing this process is the master that is directly paired with the peripheral device. The process then forwards (at 390) the control settings of the peripheral to each of the slave devices in the group. This ensures that the control settings of the peripheral are available to all devices in the group, and that any host device in the group, whether as master or as slave, can adjust the settings of the peripheral device. The process 300 then ends.

II. Automatic Pairing by Reusing Pairing Information

As mentioned, in some embodiments, information used by a host device to pair with a peripheral device is reused by another host device to pair with the same peripheral device. The pairing information in some embodiments includes information for identifying the peripheral. A host device having the pairing information for a peripheral device would be able to use the peripheral's identifying information (e.g., the peripherals ID or address) to pair with the peripheral. On the other hand, a host device without the pairing information would have to first broadcast a discovery or inquiry message for finding and identifying the peripheral. Only when a peripheral device has responded to the inquiry with its own identifying information would the host device be able to pair with the peripheral. Thus, being able to share and reuse the pairing information would greatly reduce the time required to pair with the peripheral device and improve user experience. The term "pairing" in this document refers to the process of connecting two devices as a pair, specifically, between a host device and a peripheral device. In some embodiments, to pair two devices that have never paired before would require the two devices to negotiate how their pairing connection will work in the future, while to pair two devices that have paired before and retained record or information of the previous pairing would not require the two devices to negotiate again.

In some embodiments, the pairing information is reusable by different host devices because it is independent of the host devices. In some embodiments, during the pairing process between the peripheral device and a host device, the pairing information is used in combination with identifying information of the host device to create a link key. This link key is host device specific and cannot be shared between different host devices.

In some embodiments, such pairing information is provided by another host device in the peripheral group over the network. In some embodiments, the pairing information is stored in a computing cloud, and the host device retrieves the information as part of the account information or profile for the user. In some embodiments, the pairing information for a peripheral device is stored locally at a host device as it was used by a previous pairing with the peripheral device. The storage of pairing information will be further described below by reference to FIG. 7.

In some embodiments the pairing information is generated and stored when a host device belonging to the user of the peripheral had earlier performed discovery or inquiry operation and learned the identifying information of the peripheral device. Once generated and stored, the pairing information becomes reusable by any host device belonging to the same user.

Figure 4:
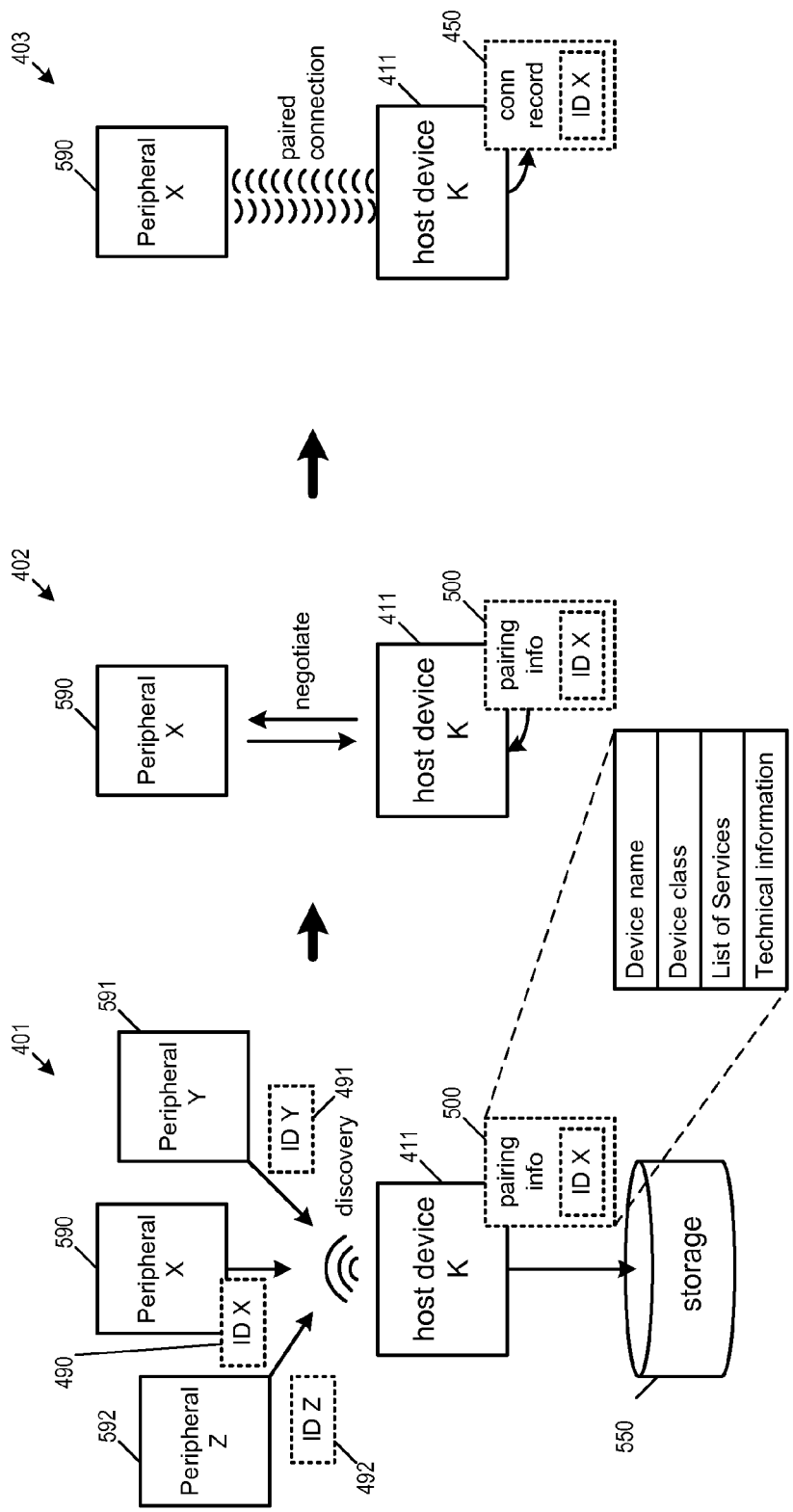
FIG. 4 illustrates the generation of reusable pairing information from a peripheral discovery/inquiry process.

For some embodiments, FIG. 4 illustrates the generation of a reusable pairing information from a peripheral discovery/inquiry process. Specifically, in three stages 401-403, the figure illustrates the generation of a pairing information 500 for a peripheral device 590 by a host device 411. The generated pairing information 500 is then stored in the storage 550 for future reuse.

At the first stage 401, the host device 411 broadcasts peripheral discovery/inquiry messages wirelessly and wait for responses from discoverable peripherals (i.e., peripherals that are in discoverable mode) within wireless transmission range. For some embodiments in which the pairing connection is a Bluetooth connection, the peripheral discovery/inquiry process is based on the specification of the Bluetooth standard. As illustrated, the peripherals 590, 591 and 592 are discoverable devices that are in the wireless transmission range of the host device 411. The discoverable peripheral devices 590, 591, and 592 receive the broadcast inquiry message and in turn respond with response messages 490, 491, and 492. The response message of each peripheral device includes the peripheral's identifying information. In some embodiments, each of such response messages includes the responder's device name, device class, list of services, and other technical information.

The host device 411 also generates the pairing information 500 based on the identifying information for the peripheral 590, which is received in the response message 490. The host device 411 then stores this generated pairing information in the storage 550. The stored pairing information 500 is then reusable by other host devices for pairing with the peripheral 590 at a later time (by e.g., the host devices 511 and 512 of FIG. 5).

At the second stage 402, the host device 411, based on the received inquiry responses, identifies the peripheral 590 as the peripheral device that it wants to pair with. It then proceed to pair with the peripheral 590 by using the information provided by the inquiry response 490 sent by the peripheral 590. Since the host device 411 has not paired with the peripheral 590 before, it has to negotiate the term of future connection with the peripheral 590 during the pairing process.

At the third stage 403, the host device 411 has established a paired connection with the peripheral 590. The host device 411 has also retained a connection record 450 for future use. The connection record 450 indicates that the host device 411 has previously paired with peripheral 590, and that any future pairing between the host device 411 and the peripheral 411 would not require further negotiation between the two devices. Unlike the pairing information 500 which is reusable by different host devices, the connection record 450 is reusable only by the host device 411. In some embodiments, most or all of the host devices in a peripheral group have previously paired with the peripheral so the pairing connection with the peripheral device can be "handed off" from host device to another. However, each host device would still have to have its own connection record, i.e., to have negotiated its own term of connection with the peripheral device from its own previous pairing with the peripheral. The hand-off of pairing connection will be further described in Section III below.

Figure 5A:
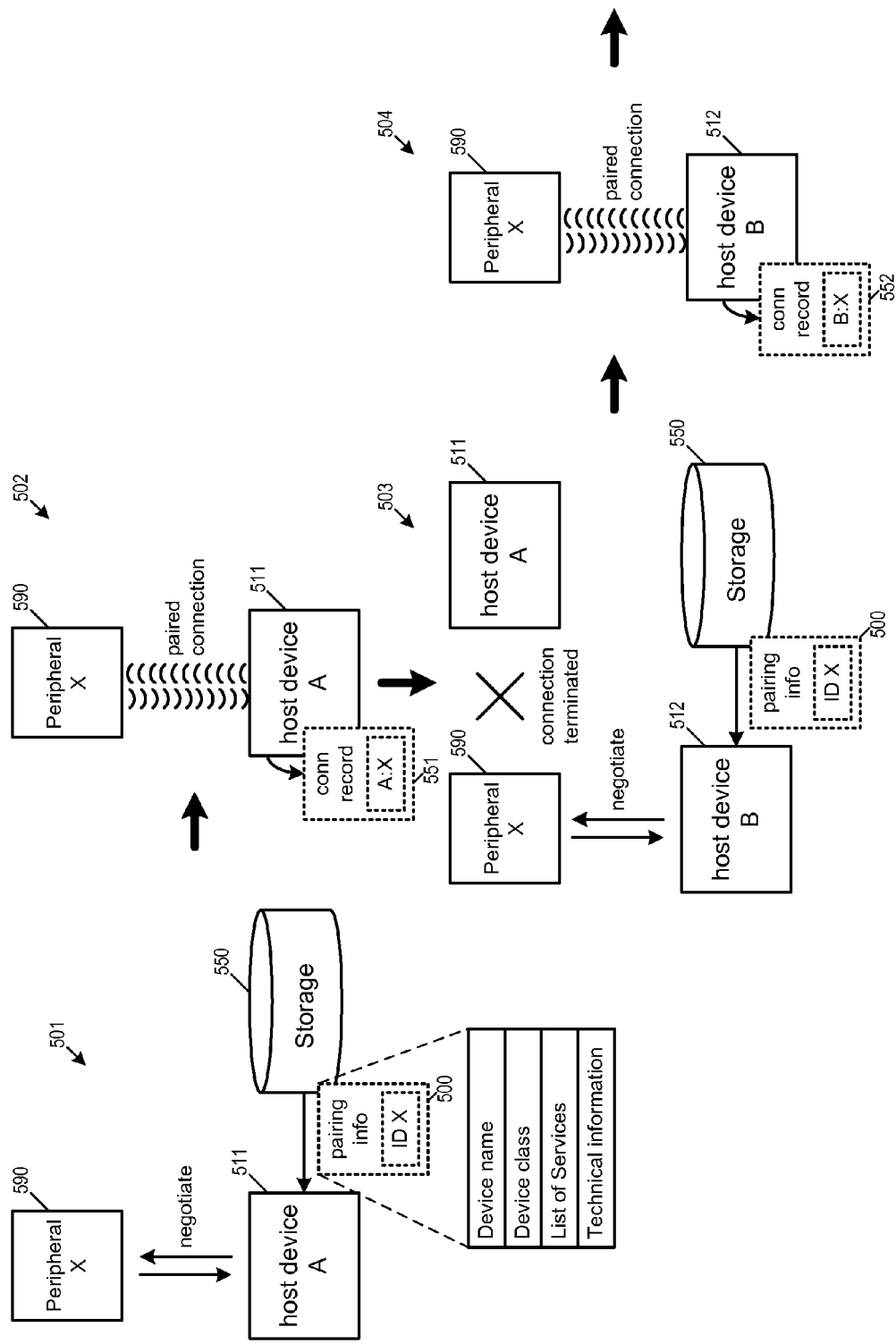
FIGS. 5a-b illustrate the reusing of pairing information and connection record for pairing with a peripheral device.
Figure 5B:
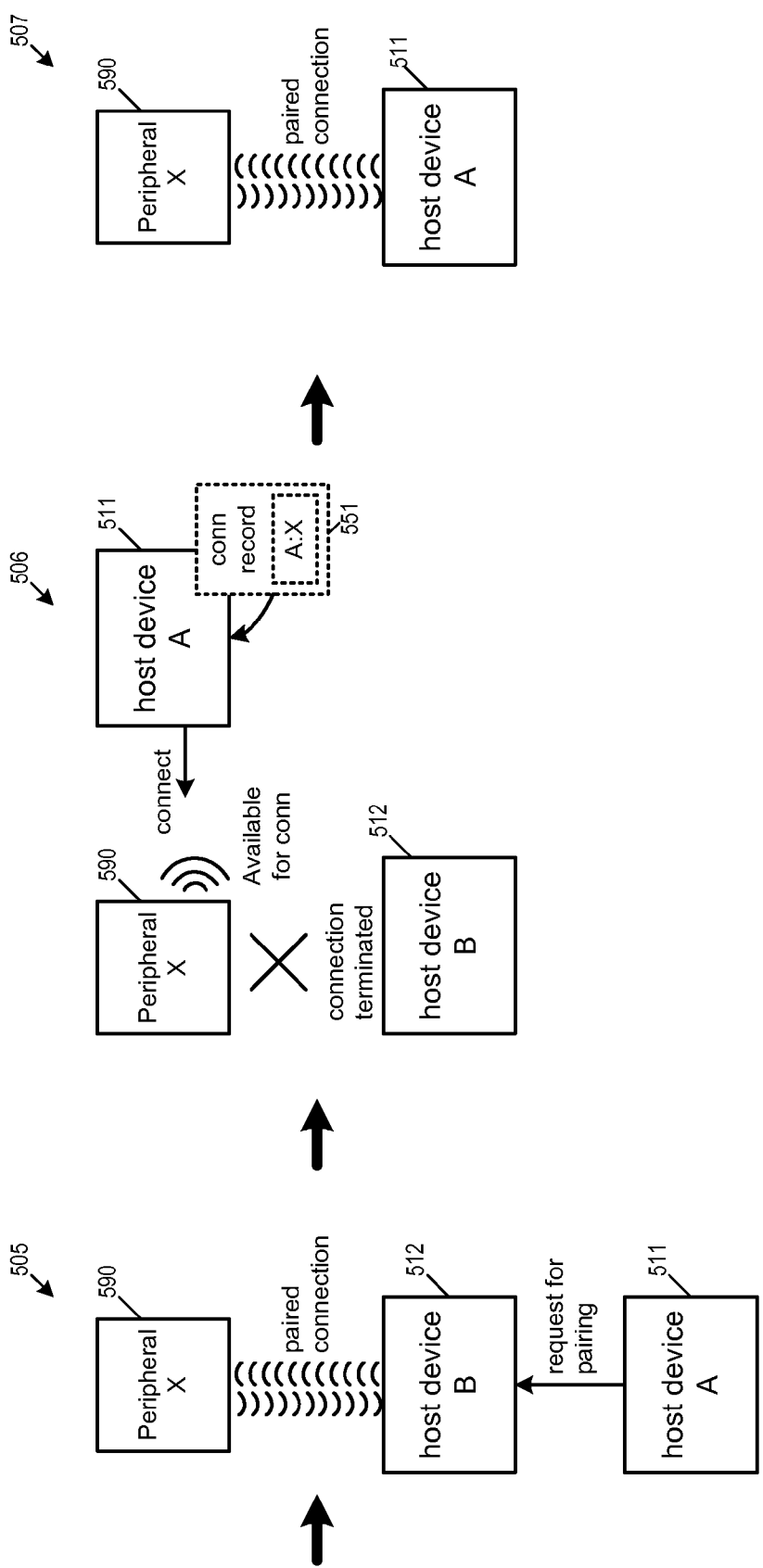

FIGS. 5a-b illustrate the reusing of pairing information and connection record for pairing with a peripheral device. In seven stages 501-507, the figure illustrates the use the pairing information 500 by multiple different host devices 511 and 512 at different points in time to pair with the peripheral device 590, as well as the generation and the reuse of connection record by individual host devices to accelerate the pairing with the peripheral 590.

At the first stage 501, the host device 511 retrieves the pairing information 500 and uses the retrieved pairing information to pair with the peripheral device 590. As illustrated, the pairing information 500 is retrieved from storage 550. The storage 550 conceptually represents any storage location accessible by the host devices 511 and 512 (e.g., another host device in the network, cloud storage, local storage, etc.). The retrieved pairing information 500 allows the host device 511 to identify the peripheral 590 and to pair with it without performing discovery/inquiry.

The pairing information includes information for identifying the peripheral device 590 so the host device 511 can proceed to pair with the peripheral device 590 without having to perform discovery or inquiry first. For some embodiments for which the pairing connection is a Bluetooth connection, the pairing information includes some or all of the following fields of information regarding the peripheral device 590: its device name, its device class, its list of services, and its other technical information. In some embodiments, these fields of information are obtained from the peripheral device from an earlier discovery/inquiry operation. With these fields known from the pairing information 500, the host device 511 is able to initiate a pairing operation that is targeted at the peripheral 590. However, since the host device 511 has not paired with the peripheral 590 before, it has to negotiate with the peripheral 590 during the pairing process.

At the second stage 502, the host device 511 has established a paired connection with the peripheral 590 and is communicating control setting and/or media content to the peripheral over the pairing connection. The connection also allows the host device to generate or retain a connection record 551. The connection record 551 is specific to the pairing of the host device 511 and the peripheral 590.

At the third stage 503, the host device 511 has terminated its paired connection with the peripheral device 590. The host device 512 in turn also retrieves the pairing information 500 from the storage 550 and uses it to pair with the peripheral device 590 as the host device 511 had done earlier at stage 501. As mentioned, in some embodiments, the wireless pairing connection for the peripheral device allows pairing with only one host device at a time. Thus, in order for the host device 512 to pair with the peripheral 590, the host device 511 must terminate or relinquish its paired connection with the peripheral device. In some embodiments, the host device 512 would proceed to pair with the peripheral device only when it detects that the peripheral 590 is available for pairing (i.e., the peripheral device has ended its previous paired connection.) However, since the host device 512 has not paired with the peripheral 590 before, it has to negotiate with the peripheral 590 during the pairing process.

At the fourth stage 504, the host device 512 has established a paired connection with the peripheral 590 and is communicating control setting and/or media content to the peripheral over the pairing connection. The connection also allows the host device to generate or retain a connection record 552. The connection record 552 is specific to the pairing of the host device 512 and the peripheral 590.

At fifth stage 505, the host device 512 is paired with the peripheral device 590 and is communicating data (e.g., media content or control setting) to the peripheral. The host device 512 also receives a request to pair with the peripheral 590 from the host device 511.

At the sixth stage 506, the host device 512 has terminated its paired connection with the peripheral device 590 and the peripheral device 590 indicates that it is available for connection. Since the host device 511 has already paired with the peripheral 590 before (at the stage 590), the host device 511 is able to use its connection record 551 to immediately connect/pair with the peripheral 590 without having to perform discovery/inquiry or negotiate for terms of connection. Finally at stage 507, the host device 511 is paired and connected with the peripheral 590.

Figure 6:
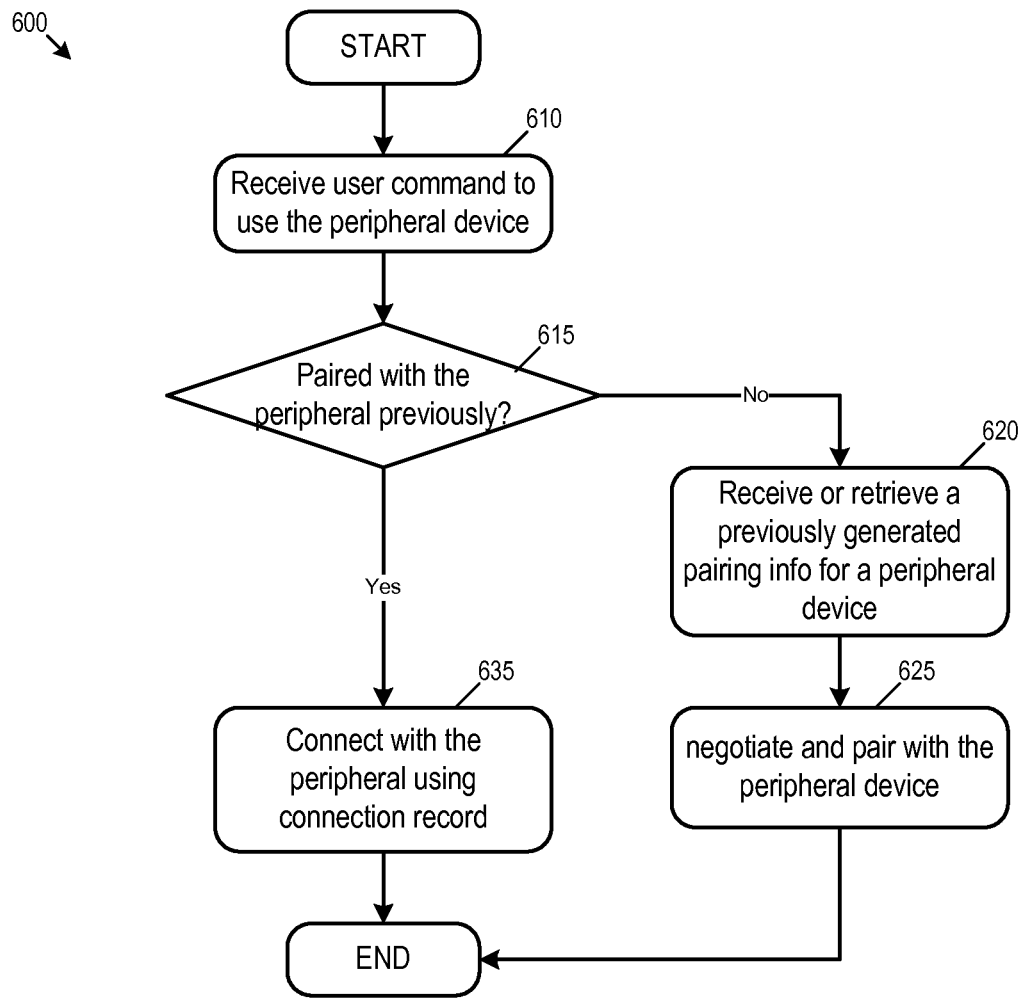
FIG. 6 conceptually illustrates a process for reusing pairing information for pairing with a peripheral device for some embodiments.

FIG. 6 conceptually illustrates a process 600 for reusing pairing information for pairing with a peripheral device for some embodiments. The process is performed by a computing device that is interested in serving as a host device for the peripheral device. The process 600 starts when it receives (at 610) a user command to use the peripheral device. For some embodiments in which the peripheral device is a hearing aid, the user of the hearing aid may bring up a GUI window at one of user's own devices (e.g., a mobile phone or tablet) in order to either control the hearing aid or to play audio content on the hearing aid. The user's action is interpreted as a command to connect with the peripheral device.

Next, the process determines (615) if the device performing the process 600 has paired with the peripheral device previously. In some embodiments, the device retains records of previous pairing so it knows if it had paired with the peripheral before. If the process has paired with the peripheral before, the process proceeds to 635. Otherwise, the process proceeds to 620.

At 620, rather than performing a discovery or inquiry operation to look for the peripheral device, the process retrieves pairing information for the peripheral device. As mentioned, this pairing information may be stored within the host device itself, or retrieved/received over the network from another computing device, from a storage device, or cloud storage based on the account of the user. The process 600 then pairs (at 625) with the peripheral device. Since the device has not previously paired with the peripheral device (e.g., no connection record), this pairing process requires a negotiation of the future connection with the peripheral device. After negotiating and pairing, the process 600 ends.

At 635, the process uses the record of the previous pairing with the peripheral to connect with the peripheral. Since device has paired with the peripheral before and the terms of the connection has been negotiated, the process need not negotiate with the peripheral device again in order to pair. After having paired with the peripheral device, the process 600 ends.

As mentioned, in some embodiments, the pairing information for a peripheral device, once generated, is stored and made available to host devices that need to connect to the peripheral device. In some embodiments, the pairing information of a peripheral belonging to a user is stored in storage locations that are assigned to the user. In some embodiments, all active host devices (e.g., mobile phones, tablets, laptops, desktops, etc.) of the user have access to those storage locations and are able to retrieve the pairing information of the particular peripheral device. In some embodiments, such storage locations are in a computing cloud so any device belonging to a particular user may retrieve user specific information from the cloud (by e.g., logging into the user's account), including information for his peripheral devices.

Figure 7:
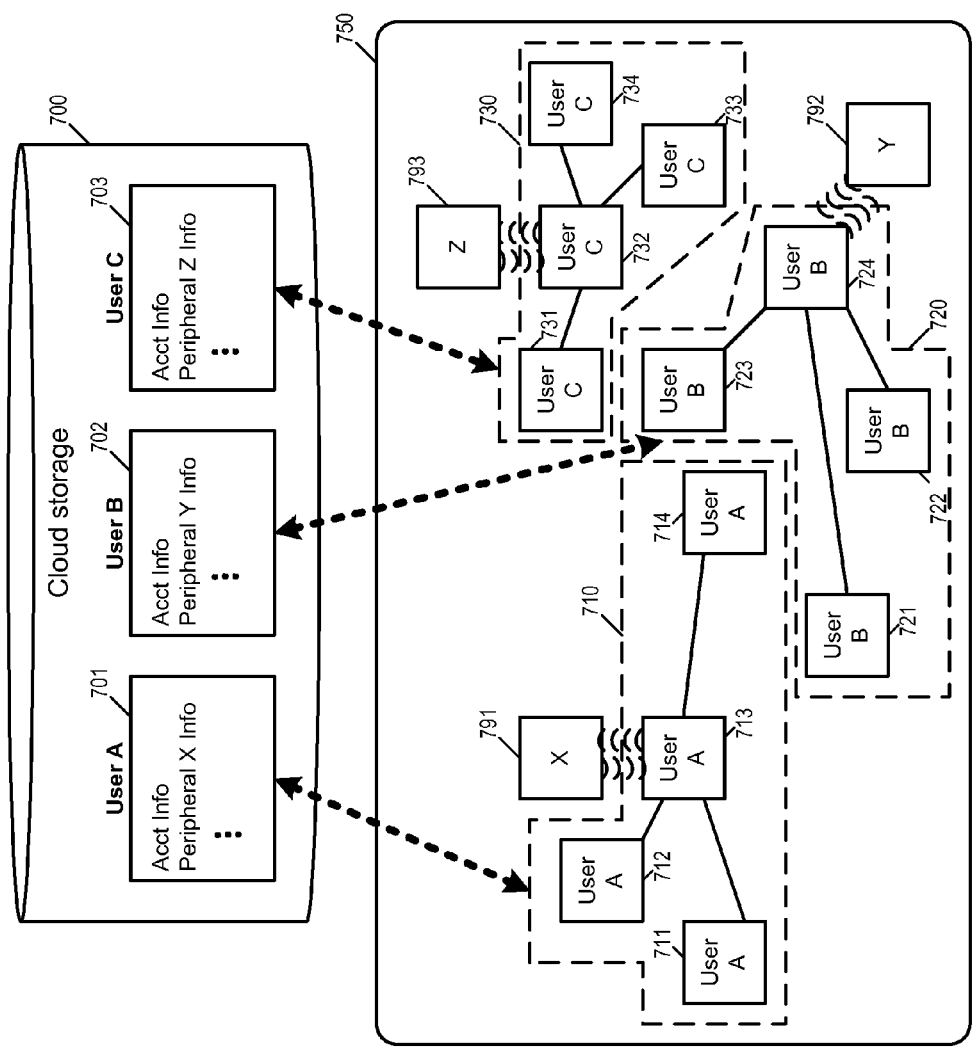
FIG. 7 conceptually illustrates the retrieval of peripheral information for different peripherals belonging to different users.

FIG. 7 conceptually illustrates the retrieval of pairing information for different peripherals belonging to different users (i.e., associated with different user accounts). The storage 700 stores information for at least three different user accounts 701, 702, and 703 for users A, B, and C. Each user account includes information or profile that is specific to the user account, including the information on the peripherals (e.g., hearing aid) that the user of the account is using.

The information is stored in storage 700. In some embodiments, the storage 700 represents storage capacity that is provided by one storage device or distributed across multiple storage devices. In some embodiments, the storage 700 represents cloud storage that is available to host devices connected to the cloud (e.g., Internet). In some embodiments, the network 750 is a peer-to-peer (P2P) network (a type of decentralized and distributed network architecture) in which individual nodes in the network (i.e., "peers") act as both suppliers and consumers of resources, in contrast to the centralized client-server model where client nodes request access to resources provided by central servers. In some of these embodiments, the pairing information, along with user account and profile information, is stored in one of the nodes in the network work, or distributed among several nodes in the network.

The storage 700 is accessible by host devices in a network 750, which includes host devices 711-714, 721-724, and 731-734. The network may span routers and switches in different communication mediums (both wired and wireless) and in different locations, the host devices in the network 750 may therefore be physically separated from each other. In some embodiments, the network 750 is a logical network that is implemented over several different physical networks, where the different host devices connect to the network 750 through different physical networks.

Each host device retrieves information from the storage 700 that is specific to the user of the device. As illustrated, the host devices 711-714 are authenticated for user A and retrieve information from the user account 701. The host devices 721-724 are authenticated for user B and retrieve information from the user account 702. The host devices 731-734 are authenticated for user C and retrieve information from the user account 703. As illustrated, the user account 701 for user A includes information for peripheral X (i.e., the peripheral 791), the user account 702 for user B includes information for peripheral Y (i.e., the peripheral 792), and the user account 703 for user C includes information for peripheral Z (i.e., the peripheral 793). In some embodiments, the information for a particular peripheral device includes information identifying the peripheral device as well as information needed for connecting or pairing with the peripheral device.

The devices in the network 750 in turn form groups based on the retrieved information for the peripherals. As illustrated, the host devices 711-714 have formed a group 710 for the peripheral device 791, with the host device 713 currently connected with the peripheral device 791 and acting as the master of the group. The host devices 721-724 have formed a group 720 for the peripheral device 792, with the host device 724 currently connected with the peripheral device 792 and acting as the master of the group. The host devices 731-734 have formed a group 730 for the peripheral device 793, with the host device 732 currently connected with the peripheral device 793 and acting as the master of the group. Host devices in a group for a particular peripheral device exchange data regarding the particular peripheral over the network.

As mentioned, the pairing information of a peripheral device includes identifying information that enables a host device to pair with the peripheral device without performing peripheral discovery and inquiry. In some embodiments, when the pairing information is not available, a host device would perform discover or inquiry operation in order to obtain the identifying information from the peripheral. The information obtained from the discovery process is then stored for future use by host devices in the same peripheral group.

Figure 8:
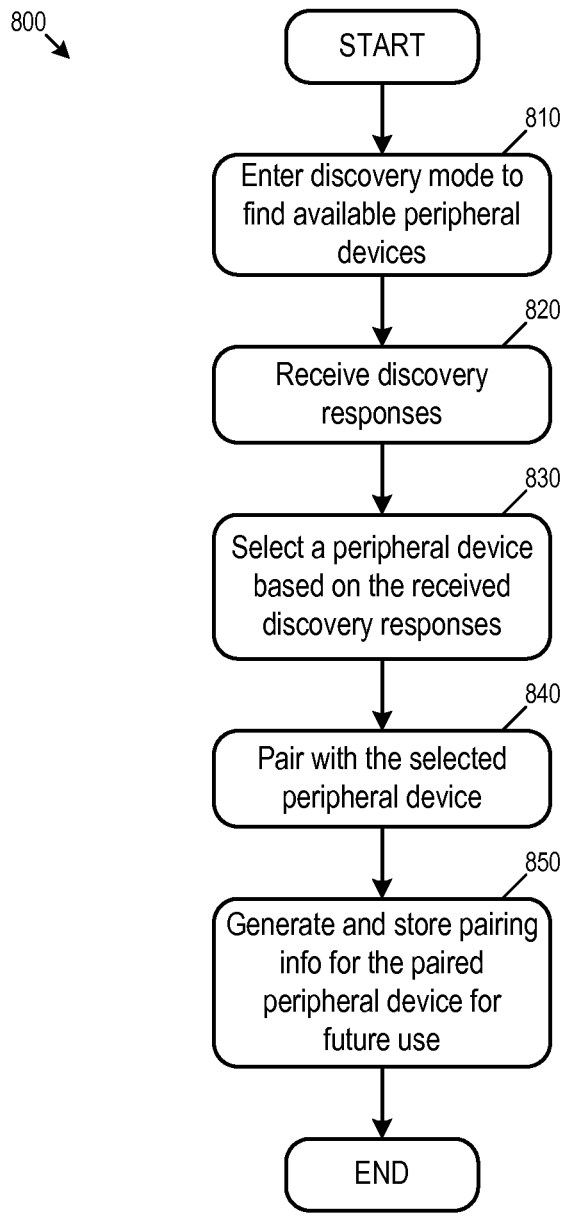
FIG. 8 conceptually illustrates a process for generating and storing reusable pairing information.

For some embodiments, FIG. 8 conceptually illustrates a process 800 for generating and storing reusable pairing information. The host device 411 in some embodiments performs the process 800 when generating the pairing information 500.

The process 800 starts when the host device performs discovery/inquiry to discover available peripheral devices in range. The process in some embodiments broadcast inquiry messages inviting recipients to respond and to report their identifying information. The process then receives (at 820) the discovery responses (i.e., the response to the inquiry messages) from peripheral devices that are discoverable. Each of the discovery responses (e.g., responses 490, 491, and 492 from the peripherals 590, 591, and 592) includes information for identifying the sender of the response.

The process then selects (at 830) a peripheral device for pairing based on the received discovery responses and pairs (at 840) with the selected peripheral device. The process also generates (at 850) and stores pairing information for the paired peripheral device for future use, by the host device or by another host device that is "interested" in the peripheral.

III. Handing Over Paired Connection Based on Media Content

A peripheral group is a group of communicatively linked devices that are interested in providing media content to a corresponding peripheral device. However, in some embodiments, a peripheral device can only have one paired direct connection for accepting the provided media content. Consequently, the different host devices in a group must take turns to pair with the peripheral device. As defined earlier, a master device is the host device that is currently paired with the peripheral device, and a slave device is a host device that is communicatively linked with the master device for exchanging data regarding the peripheral device but is not currently paired with the peripheral device.

In some embodiments, in order to provide media content to the peripheral device from a slave device, the slave device would send a request to the master device through a network or communications medium that interlinks the master and the slave. The master device in turn decides whether to accept or deny the request. In some embodiments, the decision is based on an examination of the priority of the media content that the slave device is requesting to provide. If the master decides to accept the request, it breaks its paired connection with the peripheral device. The slave device in turn uses the pairing information or its own connection record from a previous pairing with the peripheral to pair with the peripheral device.

Figure 9:
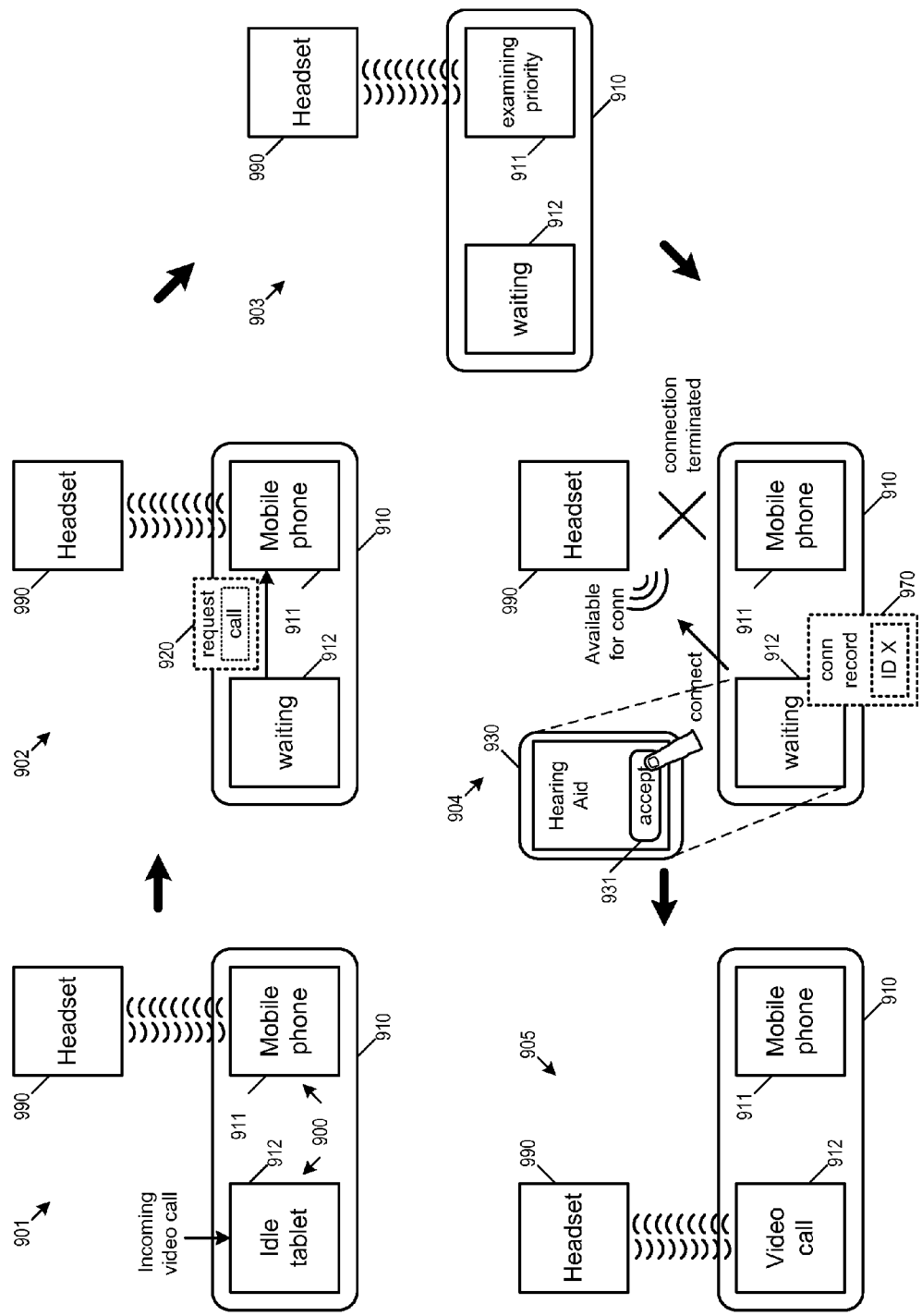
FIG. 9 illustrates a master device relinquishing its paired connection with a peripheral in favor of a slave device in its peripheral group.

For some embodiments, FIG. 9 illustrates a master device relinquishing its paired connection with a peripheral in favor of a slave device in its peripheral group. The handover of the paired connection is based on the importance of the media content that the slave device is making the request for. The figure illustrates two host devices 911 and 912 that are in a peripheral group 900 for a peripheral device 990. The group 900 is established by exchange of data between computing devices interlinked by a network 910. In this example, the host device 911 is a mobile phone, the host device 912 is a tablet computer, and the peripheral device 990 is a wireless (e.g., Bluetooth) audio headset (e.g., a hearing aid). FIG. 9 illustrates the mobile phone 911 handing over its pairing connection with the hearing aid 990 to the tablet computer 912 in five stages 901-905.

At the first stage 901, the mobile phone 911 is paired with the headset 990, and thus it is the master of the peripheral group 900 for the headset 990. The mobile phone 911 is able to provide media content over the paired connection as it currently "owns" the sole pairing connection with the peripheral device 990. The tablet 912 on the other hand is one of the slaves of the peripheral group 900. It is not paired with the headset 990 and does not currently "own" the sole pairing connection with the peripheral device 990. The figure illustrates the tablet 912 is initially idle but then receives an incoming video call, the audio of which the tablet 912 needs to deliver to the headset 990 so the user can use the headset to engage in the video call.

At the second stage 902, the tablet computer 912 (slave) makes a request to the mobile phone 911 (master) for pairing with the headset 990. The tablet computer 912 sends a message 920 to the mobile phone 911 over the network 910 requesting for the pairing connection with the headset 990. The request message 920 identifies the audio content that the slave device 912 is proposing to deliver to the peripheral device 990 is an incoming video call.

At the third stage 903, the master device 911 has received the request message 920 and makes a decision as to whether to relinquish the pairing connection. In some embodiments, the master device makes this decision based on the importance of the audio content that the slave is proposing to provide. Specifically, in some embodiments, the master device compares the importance or the priority of the proposed audio content from the slave device with that of the audio content currently being delivered to user (which may come from the master device or originate at the peripheral device.) In this example, the slave device (i.e., the tablet) is proposing to use the headset for conducting a video call, while the master device (i.e., the mobile phone) is not actively providing audio content to the headset except to allow the headset to perform its own hearing aid functions. The master device 911 decides that the incoming video call is more important (i.e., or has higher priority) than the hearing aid function and therefore decides to relinquish the pairing connection in favor the slave device 912.

At the fourth stage 904, the master device 911 has relinquished the pairing connection due to the request by the slave device 912. The headset 990 in turn indicates its availability for pairing, which allows the slave device 912 to know that it can proceed to pair with the headset. In some embodiments, the master device sends a message (not illustrated) to the requesting slave device indicating that the request for pairing connection to the peripheral has been granted and that the pairing connection between the master and the peripheral has been severed so the slave device may proceed to pairing. Upon knowing that the headset 990 is available for pairing, the slave tablet 912 uses its own connection record 970 for the headset 990 (from a previous pairing with the headset) and proceeds to pair with the peripheral. If the host device 912 has not paired with the peripheral 990, in some embodiments, the device 912 would uses a pairing information (not illustrated) that identifies the peripheral 990 for pairing. The use (i.e., reuse) of the connection record and the pairing information for pairing is described in detail in Section II above.

The fourth stage also conceptually illustrates a user interface 930 for the tablet 912 when the tablet is pairing with the headset (hearing aid) 990. In some embodiments, a slave device would prompt the user for acceptance of a pairing with the peripheral device before the slave device completes the pairing operation. In some embodiments, the slave device notifies or prompts the user through the user interface when the pairing information for the peripheral is retrieved but before the pairing connection is established. In some embodiments, the slave device prompts the user for acceptance after the pairing is established but before the slave device starts to use the pairing connection to deliver its media content to the peripheral device. As illustrated, the user has selected a user interface item (a button 931) to accept the newly established pairing connection with the hearing aid.

At the fifth stage 905, the tablet computer 912 has successfully paired with the headset 990. Since the tablet now has the pairing connection with the headset 990, it is now the master device of the peripheral group 900 for the headset 990. The tablet 912 as the master device provides control settings to the headset 990 by using the paired connection. The tablet 912 is also now able to use the headset 990 to conduct the video call by sending audio content of the video call through the paired connection. The mobile phone 911 (i.e., the former master device) is now a slave in the peripheral group 900. It remains communicatively linked to the network 910 with the new master device 912 to exchange data regarding the headset 990. It is also be able to request for the pairing connection and become the master once again.

In some embodiments, when the media content that the slave is proposing to send to the peripheral device is an on-demand playback of a piece of media (e.g., music track), the slave device would pause the playback of the media until the master device has relinquished the paired connection and the slave device has successfully paired with the peripheral device and become the master device. Once the slave device has completed pairing with the peripheral device, the playback of media piece resumes.

Figure 10:
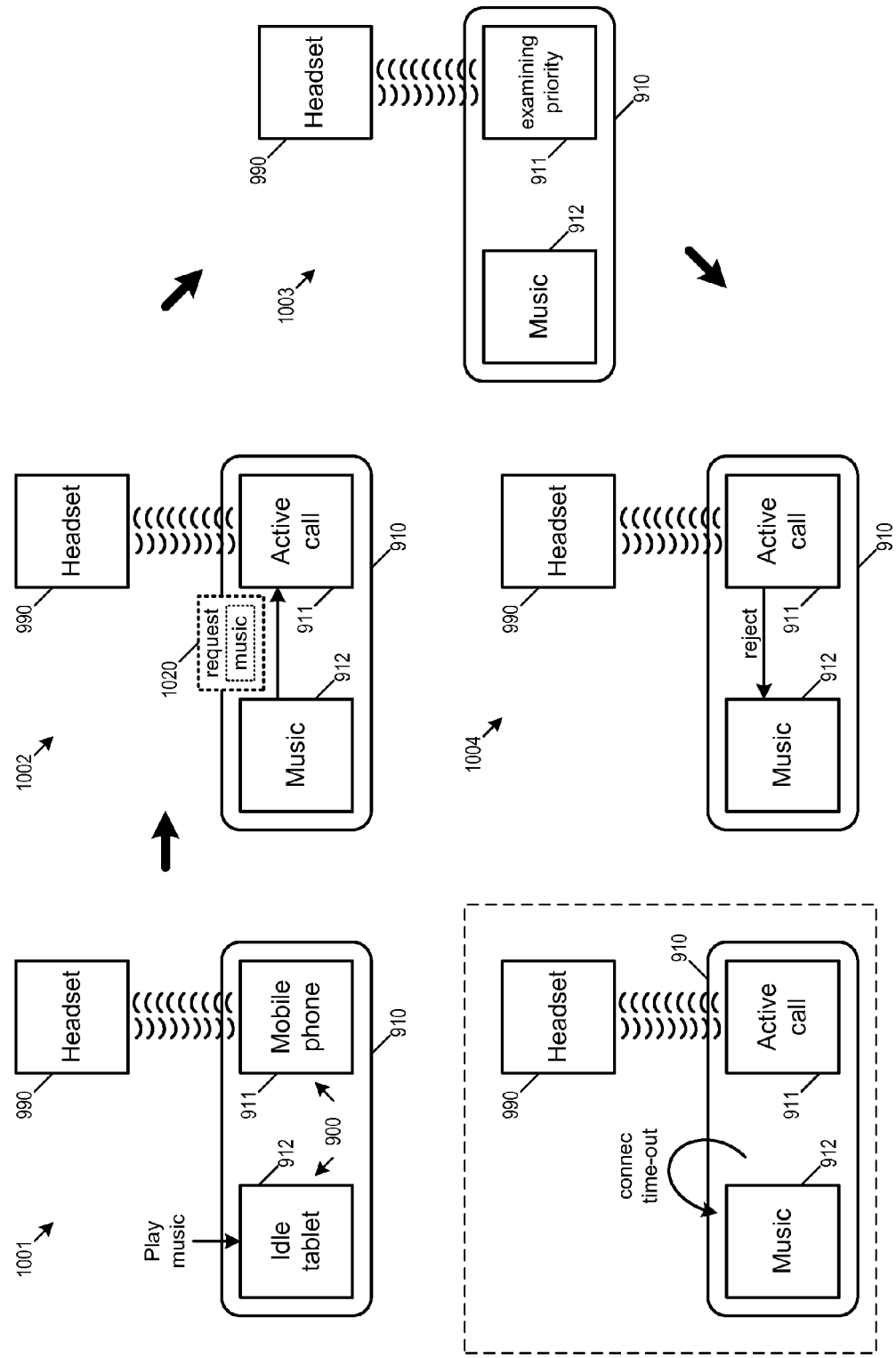
FIG. 10 illustrates a master device that rejects a request for paired connection with a peripheral.

In some embodiments, a master device may reject a request for pairing by a slave and remain paired with the peripheral device. In some embodiments, the master would reject the request if the proposed media content is of lower priority than the audio content currently being delivered to the user by the peripheral. FIG. 10 illustrates a master device that rejects a request for paired connection with a peripheral.

As in FIG. 9, FIG. 10 illustrates the mobile phone 911 and the tablet computer 912 in a peripheral group 900 for the headset 990, where the mobile phone 911 and the tablet 912 are communicatively linked over the network 910 and exchanging data regarding the headset 990. The mobile phone 911 is paired with the headset 990, and thus it is the master of peripheral group 900 for the headset 990.

In four stages 1001-1004, FIG. 10 illustrates the mobile phone 911 rejecting a request for pairing by the tablet 912. At the first stage 1001, the tablet 912 is initially idle but then receives an instruction to play music (or a piece of media content). Since the tablet 912 is not the master device of the peripheral group and is not paired with the headset 990, it will need to pair with the headset 990 first if the music that it is command to play is to reach the user through the headset. The master device mobile phone 911, on the other hand, is using the paired connection to conduct a voice call by sending audio content of the call over the paired connection to the headset 990.

At the second stage 1002, the tablet 912 sends a request message 1020 over the network 910 to the mobile phone 911 for pairing with the headset 990. The request message 1020 identifies the audio content that the tablet 912 is requesting to deliver as music.

At the third stage 1003, the master device 911 receives the request message 1020 and makes a decision as to whether to relinquish the pairing connection. As mentioned, in some embodiments, the master device makes this decision by comparing the importance or the priority of the proposed audio content from the slave device with that of the audio content currently being delivered to user. In this example, the slave device (i.e., the tablet 912) is proposing to use the headset for playing music, while the master device (i.e., the mobile phone 911) is using the headset for conducting an ongoing voice call. The master device 911 decides that the ongoing voice call is more important (i.e., or has higher priority) than the music. It therefore decides to reject the request by slave device 912.

At the fourth stage 1004, the master device 911 retains its pairing connection with the peripheral 990 because it rejects the request by the slave device 912. In some embodiments, the slave 912 knows its request has been rejected because the master device 911 sends a message over the network 910 expressly rejecting the request. In some embodiments, the master does not expressly reject slave's request for pairing. As the master device 911 is holding on to the pairing connection with the headset 990, the headset 990 will not become available and the slave device would either time-out or wait until the headset 990 does become available for pairing.

Figure 11:
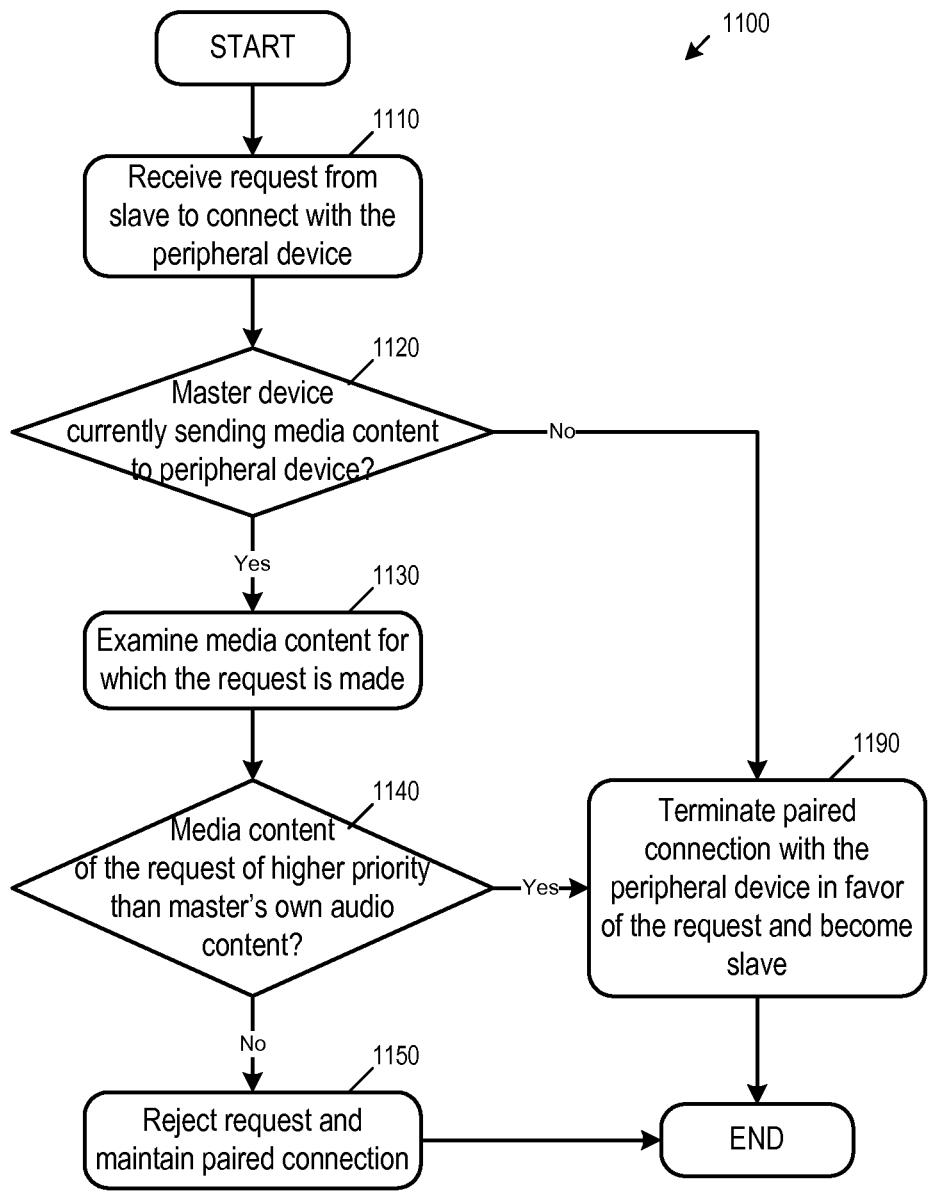
FIG. 11 conceptually illustrates a process performed by a master device in charge of a paired connection a peripheral device.

FIG. 11 conceptually illustrates a process 1100 performed by a master device (e.g., the device 911 in FIGS. 9 and 10) in charge of the paired connection with the peripheral device. The master device is communicatively linked with at least one slave device over a network. The process 1100 starts when it receives (at 1110) a request by a slave to pair with the peripheral device over the network. In some embodiments, the request from the slave device includes description or indication of the type of media content that the slave device is proposing to send to the peripheral device. This description or indication of the proposed media content allows the master to make a decision as to whether to relinquish the pairing connection with peripheral.

Next, the process determines (at 1120) whether the master device is currently sending its own media content to the peripheral device through the paired connection with the peripheral. If so, the process proceeds to 1130. If the master device is not currently using the paired connection to send media content to the peripheral device, the process proceeds to 1190.

At 1130, the process examines the media content for which the request for the paired connection is made. This examination in some embodiments is based on the description or indication of the media content in the request message from the slave. In some embodiments, this examination is based on a comparison between the media content that the slave is proposing to send to the peripheral device and the media content that the master is currently sending to the peripheral device.

In some embodiments, different types of media content are prioritized differently (e.g., assigned different priority numbers) such that the device sending the higher priority media content will be granted the paired connection with the peripheral. For example, a phone call is considered to have higher priority than media (e.g., music) playback in some embodiments (as shown described by FIG. 10 above). In some embodiments, system alert is a type of media content that is considered to have lower priority than both media playback and phone calls. In some embodiments, the priorities of the media content are dynamically assigned or updated, depending on user action or other factors.

In some embodiments, the slave request may indicate a particular media content as overriding any ongoing media content at the master so the master will have to relinquish the paired connection with the peripheral regardless of priority. In some embodiments, media content that are directly initiated by the user are given higher priorities (or overriding priority) than any other types of media content. For example, a phone call that is initiated by the user (e.g, by dialing) or is answered by the user (e.g., by tapping an answer button) has higher priority than any other types of media content. In some embodiments, on-demand media playback (e.g., music that is explicitly started by the user) is assigned overriding priority than say, an ongoing phone call and would be granted the pairing connection with the peripheral.

In some embodiments, ongoing media content being provided by the master device is weighted more heavily toward higher priority than proposed incoming media content from the slave. Thus, for example, if the proposed incoming media content and the ongoing media content are of the same type, say both are voice calls, then the master would reject the incoming voice call.

After examining media content of the request, the process determines (at 1140) whether the proposed media content of the request is of higher priority than the master's own audio content, or if the proposed media content should override the master's own audio content. If the proposed media content of the request is of higher priority than that of the master, the process proceeds to 1190. If the proposed media content of the request is of lower priority than the master's own ongoing media content and there is no indication that the proposed incoming media content should override the master's own media content, the process proceeds to 1150.

At 1150, the process rejects the request for pairing with the peripheral device (because the requested media content is of lower priority). In some embodiments, the master informs the slave that the request has been rejected. In some embodiments, the master simply holds on to the paired connection and lets the slave time-out on its own. Regardless, the master maintains its own paired connection with the peripheral device. The process 1100 then ends.

At 1190, the process relinquishes its paired connection with the peripheral by terminating the pairing because the proposed media content from the slave is of higher priority than that of the master, or if the master is not providing media content to the peripheral device. The slave device is then able to pair with the peripheral and become the new master of the peripheral group. The host device running this process 1100 then becomes a slave in the peripheral group.

Figure 12:
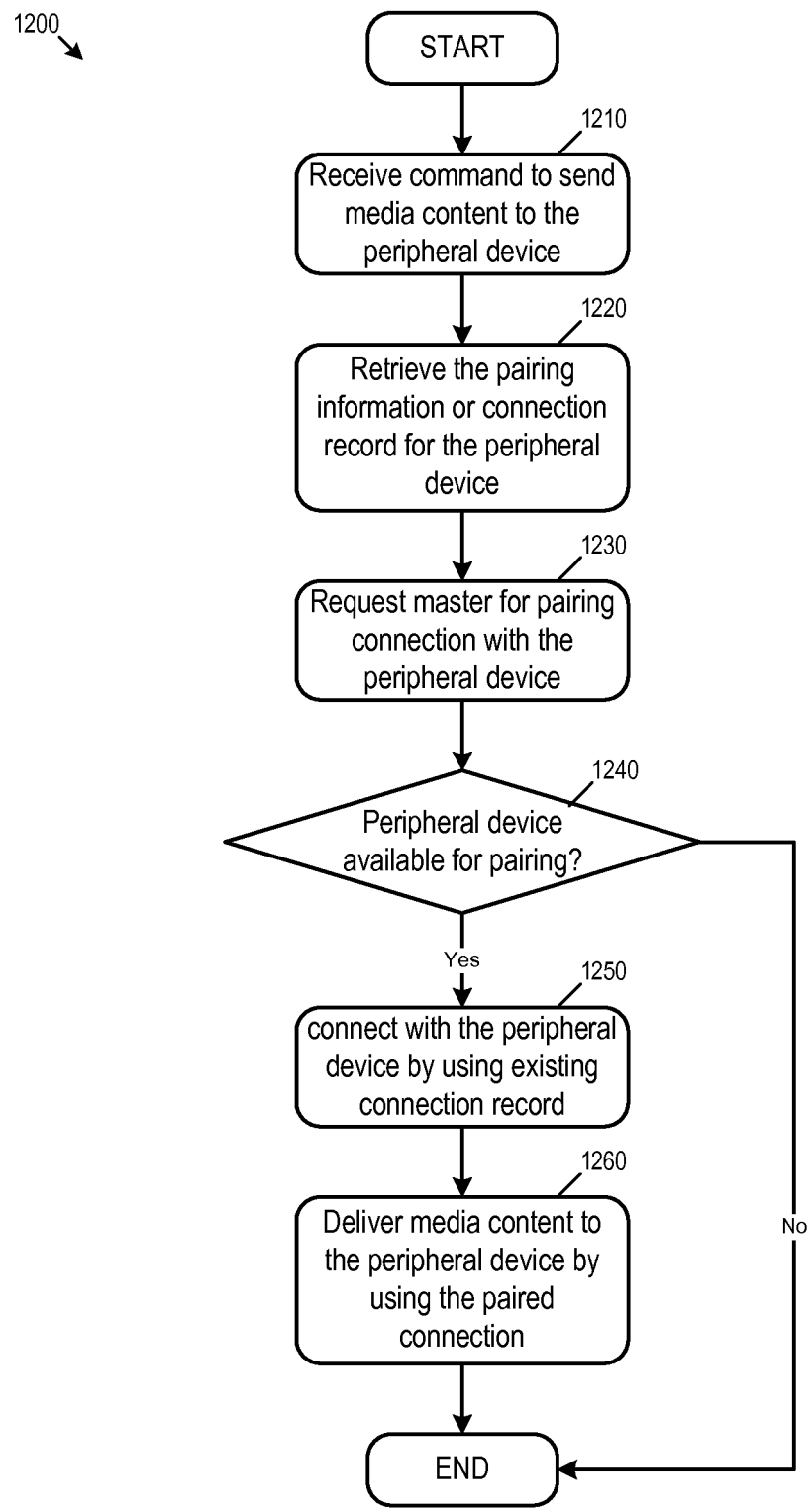
FIG. 12 conceptually illustrates a process performed by a slave device when it has media content to provide to the peripheral device.

FIG. 12 conceptually illustrates a process 1200 performed by a slave device (e.g., 912 in FIGS. 9 and 10) when it has media content to provide to the peripheral device. The process 1200 starts when it receives (1210) a command to send media content to the peripheral device. This command can be an express user command to send a particular media content to the peripheral device. The command can also be an event that produces media content for the user, such as when the slave device receives an incoming communication (voice call or phone call), system alert, or other events.

The process retrieves (at 1220) the pairing information of the peripheral device. The slave device in some embodiments has been authenticated to the user account and therefore knows the peripheral belongs to the owner of the account. Consequently, upon receiving the media command to provide the media content, the process identifies the peripheral as being a peripheral that can be used to deliver the media content to the user and retrieves the corresponding pairing information for pairing with the identified peripheral. If the slave device has previously paired with the peripheral, some embodiments would have a record for the pairing connection so the slave device can quickly pair with the peripheral device by using terms that were negotiated before.

The process next requests (at 1230) the master device for the pairing connection with the peripheral device. In some embodiments, the slave makes this request by sending a request message to the master over the network communicatively linking the peripheral group. The request message in some embodiments includes an indication or description for the media content that the slave device wants to send to the peripheral device. In some embodiments, such request message also includes an indication of the importance of the proposed media content, such as an express user override.

The process then determines (at 1240) if the peripheral device is available for pairing. Different embodiments make this determination differently. In some embodiments, the slave makes this determination based on express message from the master via the network rejecting or accepting the request. In some embodiments, the slave makes this determination by waiting for the peripheral device to become available for pairing, since a request for pairing, if granted, would result in the master relinquishing the pairing connection and make the peripheral device available for pairing. The slave in some embodiments use the retrieved pairing information for the peripheral device to determine if the peripheral is available for pairing (by e.g., attempting to pair with the peripheral device using the pairing information). If the peripheral device is not available for pairing with the slave, the slave device in some embodiments gives up after a certain time-out window and goes on remaining a slave. In some embodiments, the slave keeps trying periodically until the process is able to pair with the peripheral. If the peripheral is available for pairing, the process proceeds to 1250. If the peripheral is not available for pairing (e.g., the slave is the unable to pair and times out), the process 1200 ends.

At 1250, the process pairs/connects with the peripheral device by using the retrieved pairing information or for the peripheral device or its own connection record. The process then delivers (at 1260) the media content to the peripheral device by using the paired connection. At this point the host device running the process 1200 has become the master of the peripheral group and in charge of the paired connection with the peripheral. In other words, the device will perform the process 1100 of FIG. 11 in some embodiments. The process 1200 then ends.

Figure 13:
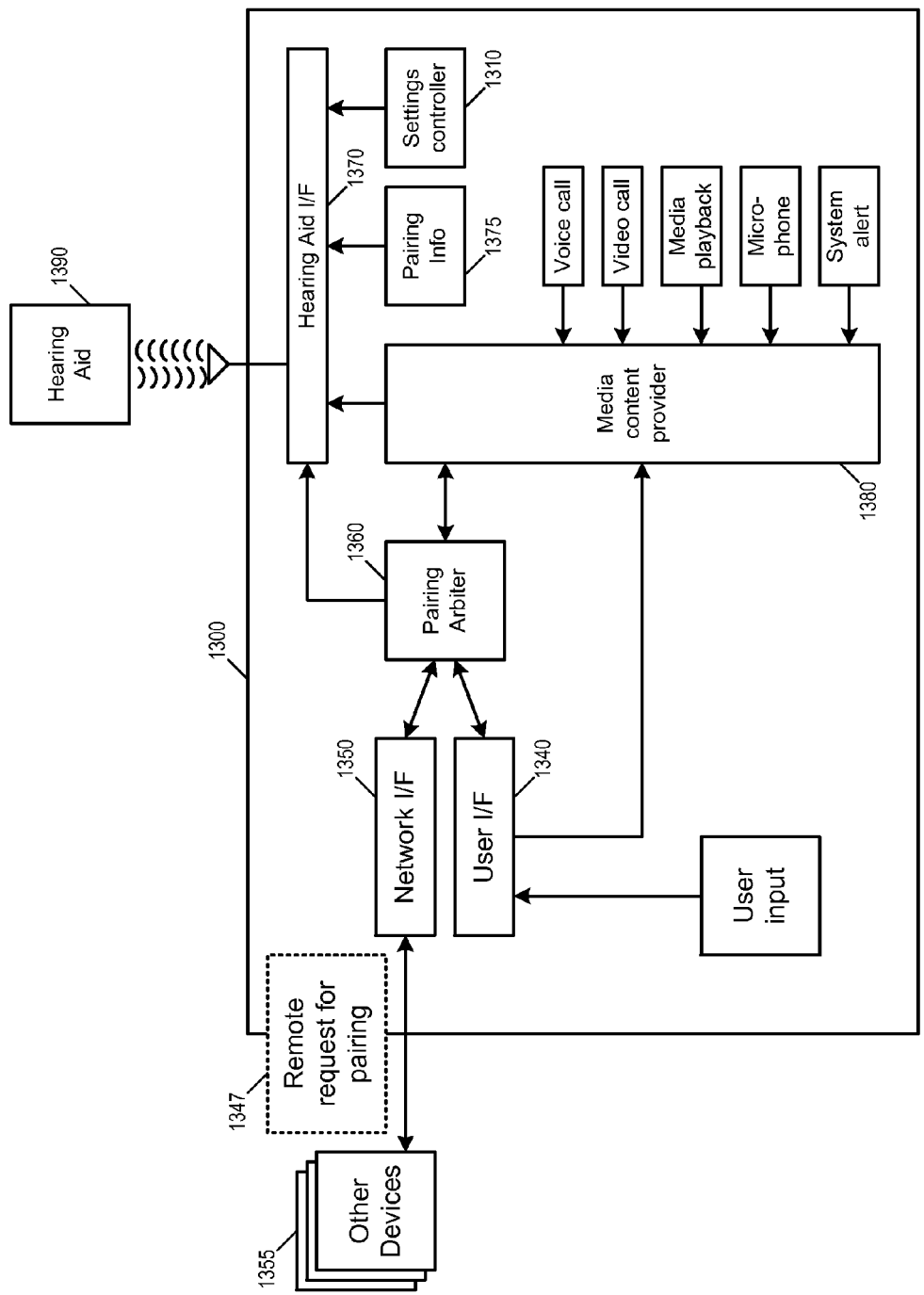
FIG. 13 illustrates a block diagram of a host device that uses a paired connection with a peripheral to provide media content.

FIG. 13 illustrates a block diagram of a host device 1300 that uses a paired connection with a peripheral 1390 to provide media content. The peripheral 1390 is a hearing aid. When acting as a master, the host device 1300 is paired with the hearing aid 1390 and can provide media content to the hearing aid 1390. When acting as a slave, the host device 1300 sends request for pairing with the hearing aid 1390 when it has media content to send to the hearing aid 1390. As illustrated, the host device 1300 includes a hearing aid interface 1370, a media content provider 1380, a pairing arbiter 1360, a pairing information storage 1375, a settings controller 1310, a user interface 1340, and a network interface 1350.

The hearing aid interface 1370 controls the pairing connection with the hearing aid 1390. It sends data to the hearing aid 1390, either control settings from the settings controller 1310 or media content from the media content provider 1380. It oversees the wireless transmissions with the hearing aid 1390. It uses pairing information and/or connection record stored in 1375 to establish paired connection with the hearing aid 1390. It also determines whether to maintain or to relinquish the paired connection with the hearing aid 1390 based on decisions from the pairing arbiter 1360. When the host device 1300 is paired with the hearing aid 1390, the hearing aid interface transmits media content (provided by the media content provider 1380) and/or settings (provided by the settings controller 1310) to the hearing aid 1390.

The pairing arbiter 1360 determines whether the host device 1300 should maintain its paired connection with the peripheral 1390. From the network interface 1350, the pairing arbiter 1360 receives a remote request for pairing 1347, which indicates that another host device in the peripheral group needs the paired connection to provide a particular type of media content to the peripheral 1390. From the media content provider 1380, the pairing arbiter 1360 receives information on the type of media content that the host device 1300 is providing to the peripheral 1390. The pairing arbiter 1360 in turn makes a decision as to whether the hearing aid interface 1370 should maintain or relinquish the paired connection. In some embodiments, this decision is based on a comparison of priority between the media content provided by the media content provider 1380 and the proposed media content as indicated in the remote request 1347.

The media content provider 1380 selects from one of many sources of media content that the host device 1300 may provide. As illustrated, such media content may come from a voice call, a video call, media playback (e.g., music or video clips), remote microphone (by using the host device as a remote microphone for the hearing aid), system alerts, or other types of media content. The media content provider selects from one of these media content sources and provides the selected media content to the hearing aid interface 1370. In some embodiments this selection is based on user input from the user interface 1340 or based on the application that is currently running on the host device 1300.

The network interface 1350 is for handling communications with other host devices in the peripheral group of the hearing aid 1390. When the host device 1300 is paired with the hearing aid 1390 as the master, the network interface 1350 is for handling remote request to pair with the hearing aid 1390 from other host devices 1355. When the host device 1300 is not paired with the hearing aid (i.e., acting as a slave), the network controller 1350 is for sending request to the master device for pairing with the hearing aid 1390.

IV. Remotely Control Settings to the Peripheral

In some embodiments, each host devices in a peripheral group is allowed to adjust control settings to the peripheral. Unlike providing media content to the peripheral device in which a device providing media content need to be paired with the peripheral device, a slave device adjusting the control settings of the peripheral can do so remotely without being directly paired with the peripheral device in some embodiments. In some embodiments, any adjustment to the control setting will be propagated to all devices in the group in order to keep the control settings of the peripheral synchronized across group.

Figure 14A:
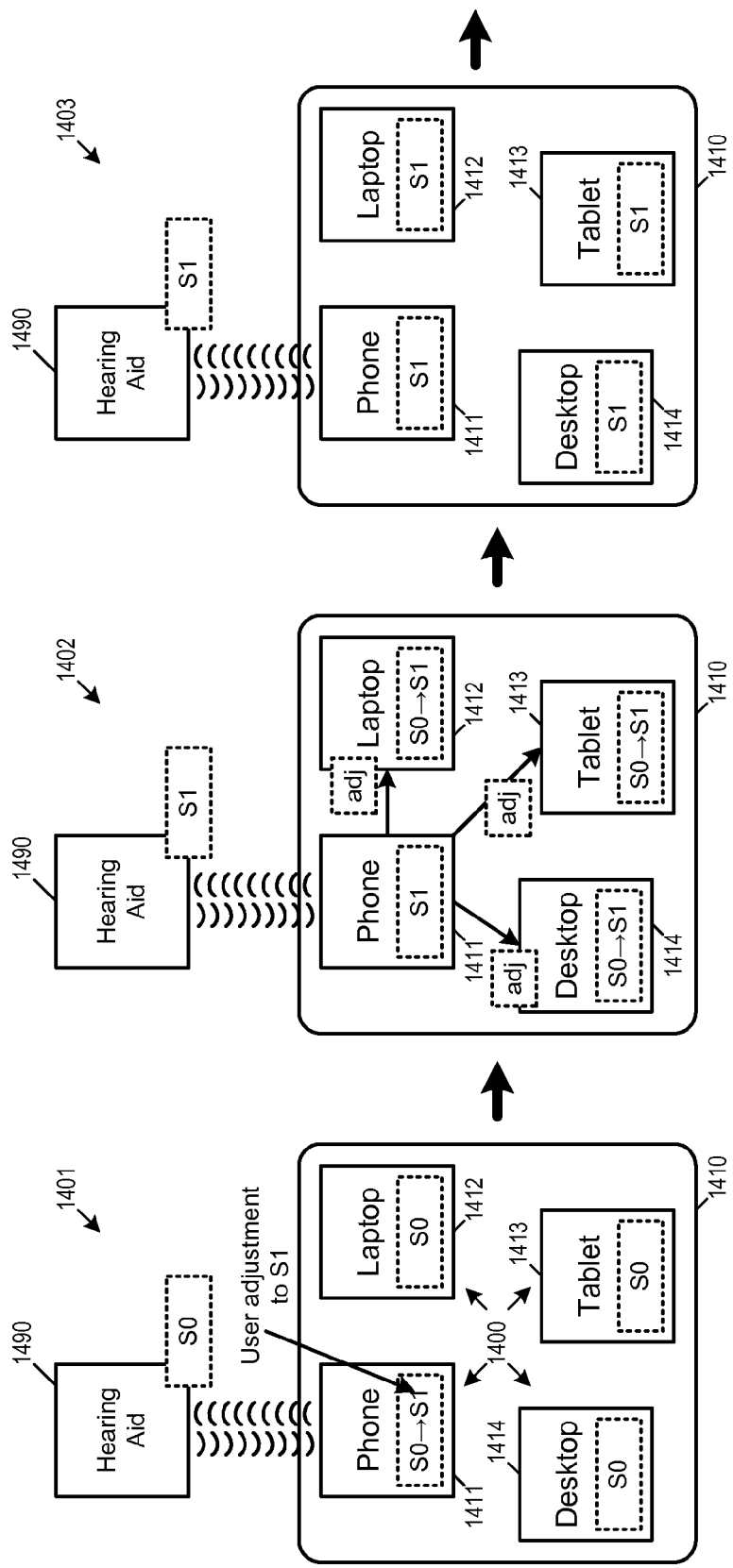
FIG. 14a illustrates the synchronization of control settings for a hearing aid.
Figure 14B:
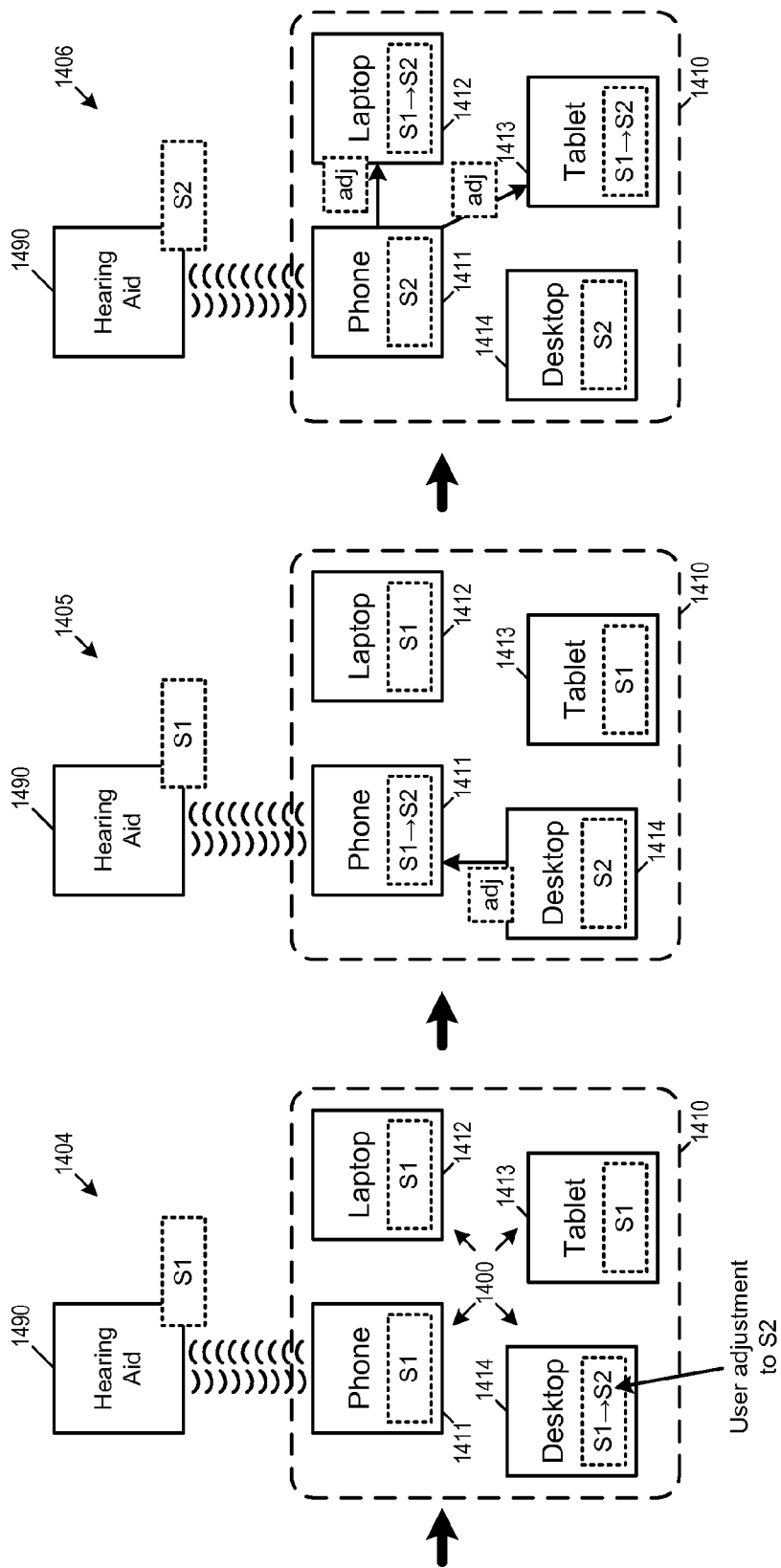
FIG. 14b illustrates the remote adjustment of control settings to the hearing aid.

FIG. 14*a* illustrates the synchronization of control settings for a hearing aid 1490. FIG. 14*b* illustrates the remote adjustment of control settings to the hearing aid 1490. As illustrated, a mobile phone 1411, a laptop 1412, a tablet 1413, and a desktop 1414 are communicatively coupled by a network 1410, and these four devices 1411-1414 belong to a same peripheral group 1400 for the hearing aid 1490. These devices in the group have been exchanging data with each other regarding the hearing aid 1490. The mobile phone 1411 is directly paired with the hearing aid 1490 and is therefore the master of the group 1400. The laptop 1412, the tablet 1413, and the desktop 1414 are not directly paired with the hearing aid 1490 and are therefore slaves of the group 1400.

In three stages 1401-1403, FIG. 14*a* illustrates the synchronization of control settings. Specifically, FIG. 14*a* illustrates the propagation of a control setting adjustment when the adjustment is made by the user at the master device 1411. At the first stage 1401, the master device 1411 is applying an initial set of control settings labeled "S0" to the hearing aid 1490 through the paired connection. A copy of the same control settings "S0" is stored locally at each of the slave devices 1412-1414. As illustrated, the user has made an adjustment to the control setting at the master device 1411 that would change the control setting of the hearing aid from "S0" to another set of settings labeled "S1".

At the second stage 1402, the master 1411 has made the adjustment to "S1" and started applying the new setting to the hearing aid through the paired connection. Furthermore, the master 1411 is also sending the settings adjustment to "S1" to the slave devices 1412-1414 through the network 1410. At the third stage 1403, the slave devices 1412, 1413, and 1414 have all received the control setting adjustment and updated their local copy of the hearing aid setting to "S1".

In three stages 1404-1406 FIG. 14*b* illustrates remote adjustment of control settings from a slave device in the peripheral group 1400. The stage 1404 is after the stage 1403 of FIG. 14*a*. At the stage 1404, the mobile phone 1411, the laptop 1412, the tablet 1413, and the desktop 1414 are all maintaining a copy of the hearing aid settings that is labeled "S1", and the mobile phone 1411 as the master of the group 1400 is applying the setting "S1" to the hearing aid 1490 through its paired connection with the peripheral 1490. In the meantime, the user of the desktop 1414 made an adjustment to the hearing aid control setting to change it from "S1" to a new set of settings labeled "S2".

Next, at the stage 1405, the desktop 1414 at which the adjustment is initially made by the user sends the adjustment to "S2" to the mobile phone 1411, because it is the master device of the group 1400.

Finally, at the stage 1406, the mobile phone 1411 as the master device in paired connection with the hearing aid 1490 applies the new settings "S2" to the hearing aid through the paired connection. The mobile phone 1411 also propagate the adjustment to the new settings "S2" to the remaining slave devices 1412 (the laptop) and 1413 (the tablet). The control settings for the hearing aid 1490 are henceforth synchronized to "S2" across all devices in the peripheral group.

Figure 15:
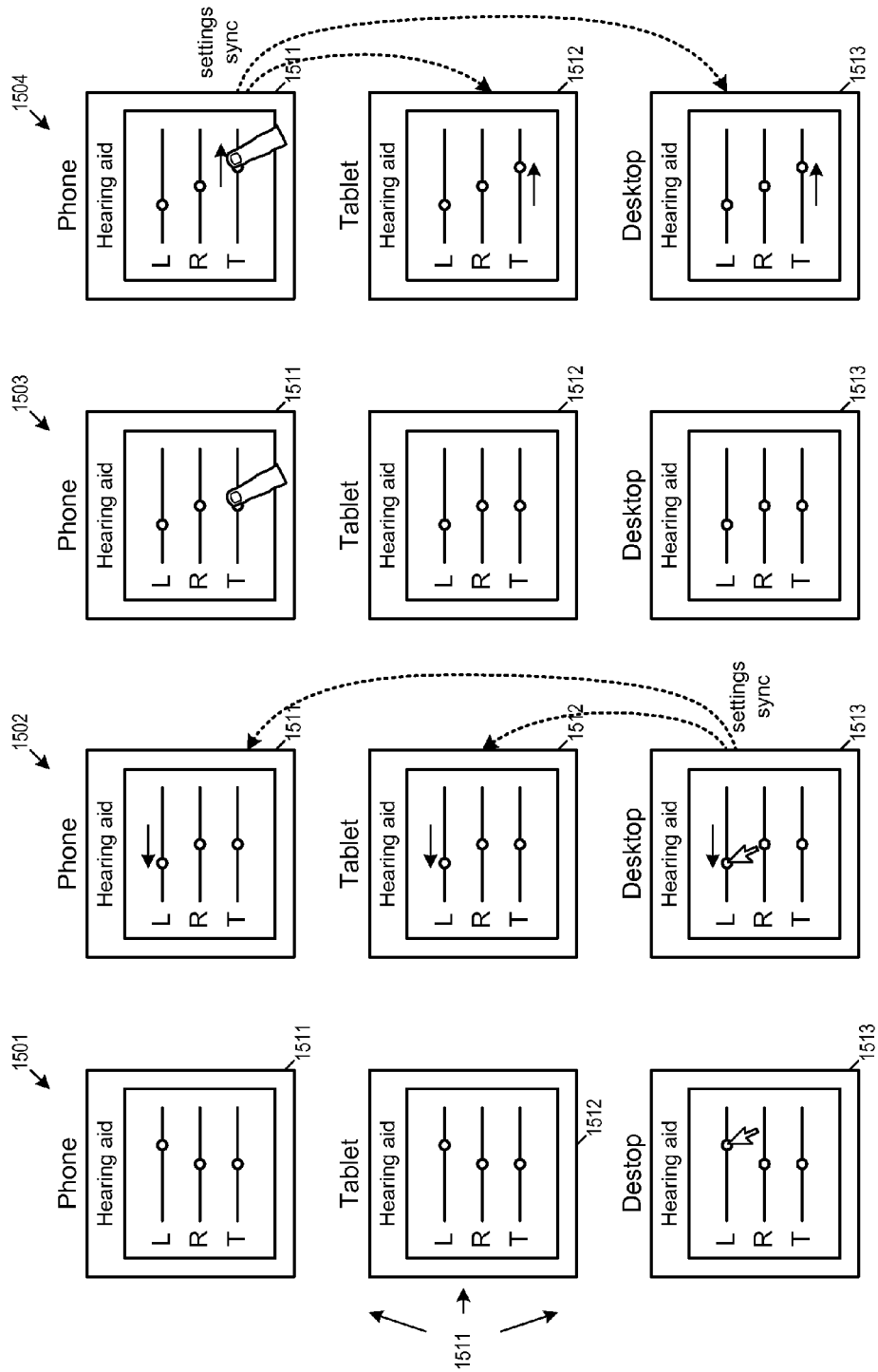
FIG. 15 illustrates the synchronization of GUI display for a hearing aid across different host devices.

The propagation of the adjustments synchronizes the control settings of the hearing aid 1490 across all host devices in the peripheral group. In some embodiments, the control settings are displayed as GUI items that the user may manipulate. In some of these embodiments, as the adjustments to the settings are remotely synchronized across the network, the GUI displays of the control settings in different host devices are also synchronized. FIG. 15 illustrates the synchronization of GUI display for a hearing aid across different host devices. As illustrated, three different host devices 1511 (a mobile phone), 1512 (tablet computer), and 1513 (a desktop computer) are in a peripheral group 1500 for a hearing aid 1590 (not shown). The peripheral group 1500 is established over a network 1510 (not shown). Each of these devices has a graphical user interface (GUI) for displaying and for controlling the settings of the hearing aid 1590. The graphical interface of each device includes sliders for left volume ("L"), right volume ("R"), and total volume ("T").

FIG. 15 shows the synchronization of GUI display of hearing aid settings in four stages 1501-1504. At the first stage, the user of the device 1513 (desktop) by using a cursor begins to move the hearing aid setting labeled 1' (left hear volume). At the second stage 1502, the user of the desktop 1513 has used the cursor to move the left volume slider to the left. The user's action at the GUI of the desktop 1513 causes the desktop to send out hearing aid settings adjustment to both the device 1512 and 1511. As a result, the GUI of the tablet 1512 and the GUI of the mobile phone 1511 also update their GUI display for the hearing aid settings.

At the third stage 1503, the user of the mobile phone 1511 begins to move the hearing aid setting labeled 'T' (total volume) by using the touch screen of the mobile phone. At the fourth stage 1504, the user of the mobile phone 1511 has used touch screen of the mobile phone 1511 to move the total volume slider to the right. The user's action at the GUI of the mobile phone 1511 causes the mobile phone 1511 to send out hearing aid settings adjustment to both the device 1512 and 1513. As a result, the GUI of the tablet 1512 and the GUI of the desktop computer 1513 also update their GUI display for the hearing aid settings.

Figure 16B:
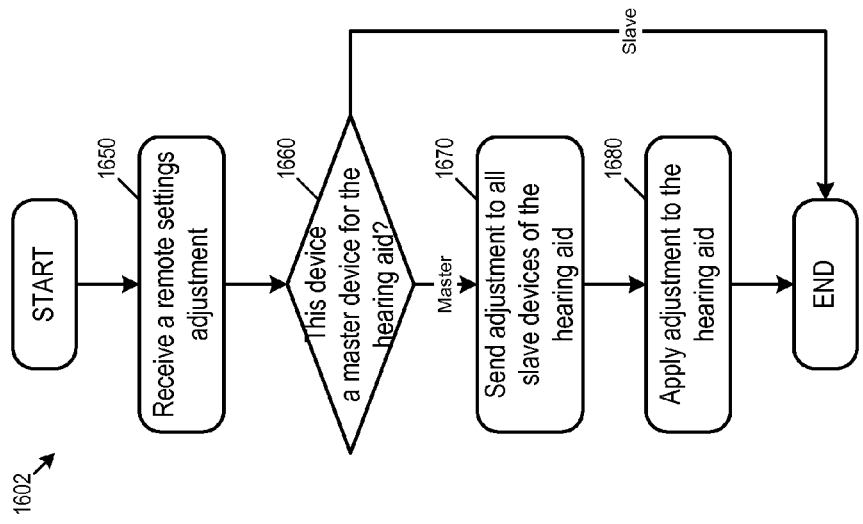
FIG. 16a-b conceptually illustrates processes for synchronizing control settings of a peripheral device across different host devices.
Figure 16A:
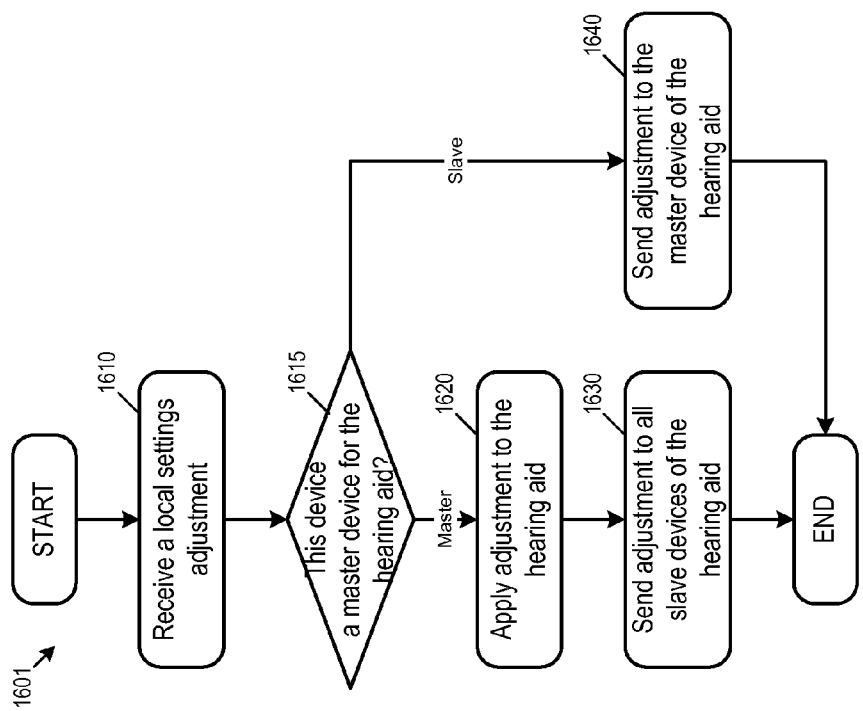

For some embodiments, FIGS. 16*a-b* conceptually illustrates two processes for synchronizing control settings of a peripheral device (e.g., a hearing aid) across different host devices.

FIG. 16*a* conceptually illustrates a process 1601 performed by a host device when it receives a local settings adjustment (i.e., an adjustment that is specified by the host device's own user interface). The process 1601 starts when it receives (at 1610) the local settings adjustment. In some embodiments, the process at 1610 also makes corresponding adjustment at the GUI of the host device.

The process 1601 then determines (at 1615) whether the host device performing the process 1601 is the master device of the peripheral group for the peripheral. If this host device is the master device (i.e., directly paired with the peripheral), the process proceeds to 1620. If the host device is a slave device (i.e., not directly paired with the peripheral), the process proceeds to 1640.

At 1620, the process 1601 applies the local adjustment to the peripheral since this host device is the master device that is paired with the peripheral and can apply the adjustment to the control setting directly. The process then transmits (at 1630) the local adjustment to all slave devices of the peripheral group for the peripheral. The host device that receives the transmitted adjustment would treat it as a remote settings adjustment and performs the process 1602. After sending the local adjustment to slave devices, the process 1601 ends.

At 1640, the process 1601 sends the local adjustment to the master device of the peripheral group. Since the host device performing the operation 1640 is not the master device at this point of the process 1601, it is not paired with the peripheral and has to send the adjustment to the master device over the network in order for the adjusted control settings to be applied to the peripheral. The master device would in turn treat the received adjustment as a remote settings adjustment and perform the process 1602. The process 1601 then ends.

FIG. 16b conceptually illustrates a process 1602 performed by a host device when it receives a remote settings adjustment (i.e., an adjustment received over the network from another host device in the same peripheral group). The process 1602 starts when it receives (at 1650) a remote settings adjustment. In some embodiments, the process at 1650 also makes a corresponding adjustment at the GUI of the host device and updates its own local copy of the control settings according to the remote adjustment.

The process then determines (at 1660) whether the host device performing the process 1602 is the master device of the peripheral group for the peripheral. If this host device is the master device (i.e., in direct pairing connection with the peripheral), the process proceeds to 1670. If the host device is a slave device (i.e., not directly paired with the peripheral), the process 1602 ends.

At 1670, the process as the master device relays the received remote adjustment to all slave devices in the peripheral group. The process then applies (at 1680) the received adjustment to the peripheral device by using its paired connection with the peripheral. The process 1602 then ends.

Figure 17:
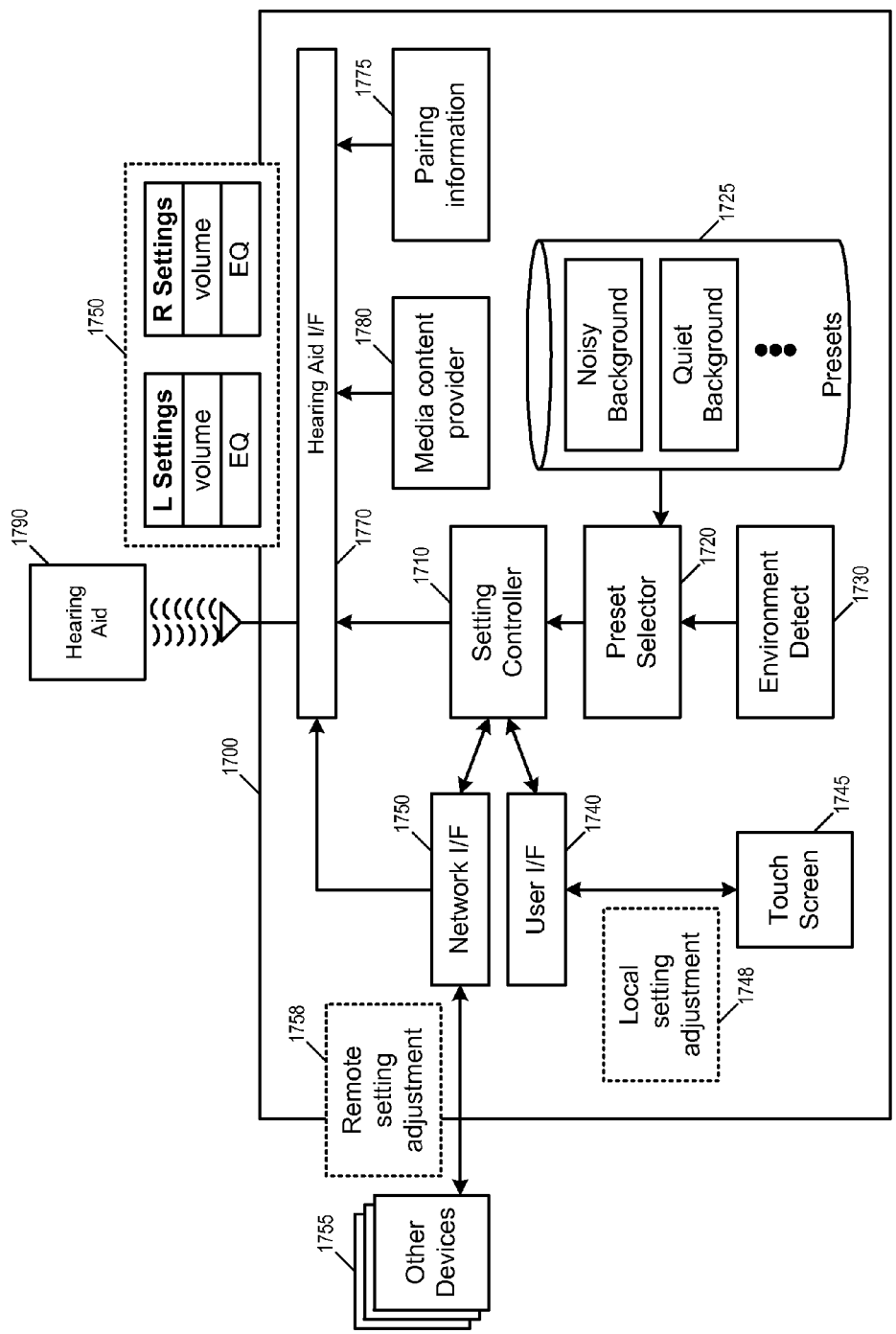
FIG. 17 illustrates a block diagram of a host device that controls the setting of a peripheral device.

For some embodiments, FIG. 17 illustrates a block diagram of a host device 1700 that controls the setting of a peripheral device 1790. The peripheral 1790 is a hearing aid. The host device 1700 can apply the control setting to the hearing aid 1790 through its paired connection with the hearing aid as a master device. The host device 1700 can also exchange control setting adjustments with other host devices in the peripheral group for the hearing aid 1790, either as a master or as a slave. As illustrated, the host device 1700 includes a hearing aid interface 1770, a media content provider 1780, a pairing information storage 1775, a settings controller 1710, a control settings preset selector 1720, an audio environment detector 1730, a user interface 1740, and a network interface 1750.

The hearing aid interface 1770 controls the pairing connection with the hearing aid 1790. It sends data to the hearing aid 1790, the data including either control settings from the settings controller 1710 or media content from the media content provider 1780. It oversees the wireless transmissions with the hearing aid 1790. It uses pairing information and/or connection record stored in 1775 to establish the paired connection with the hearing aid 1790. It also controls the pairing connections based on the network data provided by the network interface 1750 and media content provided by media content provider 1780. For example, the hearing aid interface 1770 may decide to terminate the pairing connection if the network interface 1750 indicates that another host machine is proposing to provide a priority media content that is of higher priority than the media content provided by the media content provider 1780.

The setting controller 1710 produces a set of control settings 1750 to apply to the hearing aid 1790 (through the paired connection). In some embodiments, the control settings 1750 includes a setting for left ear and a setting for a right ear. In some embodiments, the hearing aid is two peripheral devices: a left hearing aid and a right hearing aid, and the settings controller 1710 produces one set of settings for the left hearing aid and another set of settings for the right hearing aid. In some embodiments, each set of hearing aid setting includes volume, equalizer settings, and other audio settings. The settings controller receives predetermined settings for the hearing aid from the preset selector 1720, as well as adjustments to the settings from either the user interface 1740 or the network interface 1750. In some embodiments, the settings controller 1710 generates the control settings 1750 by applying the setting adjustments to the predetermined settings.

The preset selector 1720 selects a predetermined set of settings for the hearing aid 1790 based on input from the audio environment detection module 1730. In some embodiments, the preset selector 1720 selects one of several sets of presets from storage 1725. For a peripheral device that is a hearing aid, these stored presets are programmed by audiologists specifically for the user of the hearing aid. In some embodiments, different sets of hearing aid presets are available for different audio environment. For example, some embodiments include a preset for noisy background such as restaurant and a preset for quiet background such as library. The audio environment detector 1730 detects and reports the audio environment to the preset selector 1720 so the preset selector may select one of the presets accordingly. In some embodiments, the preset selector selects one of the presets based on direct user input from the user interface 1740. The selected hearing aid setting preset is sent to setting controller 1710.

The user interface 1740 is for handling direct user interactions that occur locally at the host device 1700. In some embodiments, the user interface 1740 includes a graphical user interface (GUI) for accepting user inputs. The user interface 1740 is for receiving local setting adjustments 1748 that are specified at the host device 1700. For example, the user may use a touch screen 1745 or other user input device for specifying a local setting adjustment for the hearing aid through the user interface 1740. The local setting adjustment is in turn forwarded to the settings controller 1710 so the adjustment may be applied to the selected hearing aid preset in some embodiments.

The network interface 1750 is for handling communications with other host devices in the peripheral group of the hearing aid. Specifically, the network interface 1750 is for receiving hearing aid control setting adjustments 1758 from other host devices 1755. The network interface 1750 is also for sending hearing aid control setting adjustments to other host devices 1755. When the host device 1700 is acting as a slave in the peripheral group (i.e., not directly paired with the hearing aid 1790), the user can locally specify setting adjustments by using the user interface 1740 and then sends the specified setting adjustments to the master through the network interface 1750. In some embodiments, when acting as the master of the peripheral group, the host device 1700 sends any received remote setting adjustments to all of the slaves through the network interface 1750, in order to synchronize control settings at all host devices of the peripheral group.

V. Computing Device

In some embodiments, a host device that participates in a group of devices for providing media content and control settings to a peripheral device is a computing device. In some embodiments, computing devices such as mobile phone/smart phone, tablet computer, laptop computer, or desktop computer can all operate software components that allow them to pair with the peripheral device and to communicate with each other to exchange information about the peripheral device.

Figure 18:
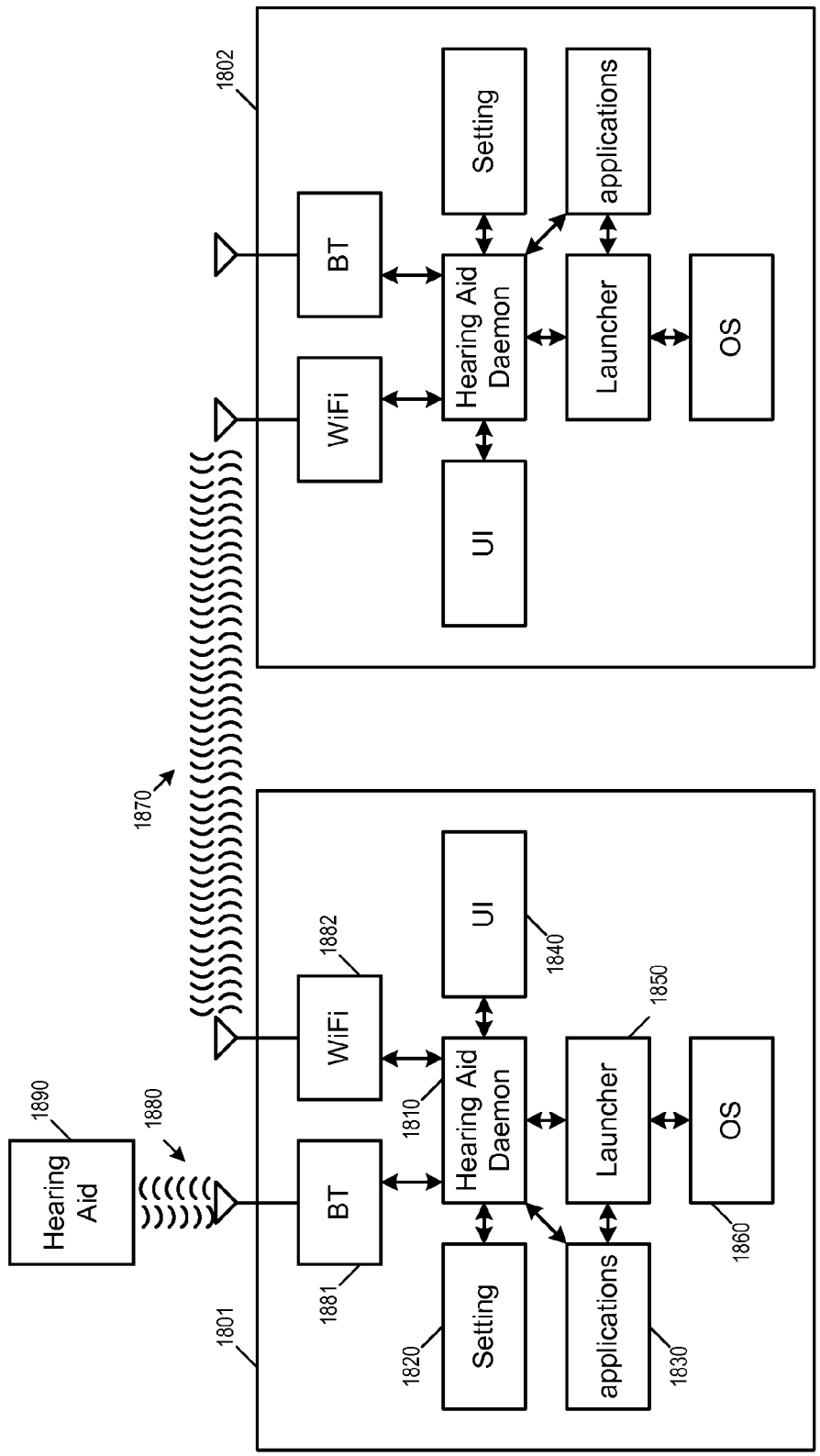
FIG. 18 illustrates the architecture of a computing device that serves as a host device for some embodiments of the invention.

FIG. 18 illustrates the architecture of a computing device 1801 that serves as a host device for some embodiments of the invention. The computing device 1801 has a low power wireless transceiver 1885 (e.g., Bluetooth) for communicating with a hearing aid 1890 in a paired connection 1880. The computing device 1801 also has a network transceiver 1875 (e.g., WiFi or Ethernet) for communicating with other computing devices over a network 1870. The computing device 1800 also includes a settings module 1820, a set of applications 1830, a user interface module 1840, an application launcher 1850, and an operating system 1860.

For purpose of illustration, the computing device 1801 is using its network transceiver 1875 to communicate with another computing device 1802 through the network 1870. The computing device 1802 is in a same group of devices as the computing device 1801 and is also "interested" in providing media content and control settings to the hearing aid 1890. The computing device 1802 can be of a same type device as the computing device 1801 or of a different type. However, the computing device 1802 includes similar components as the computing device 1801 (a low power wireless transceiver, a network transceiver, a hearing aid daemon, a settings module, a set of applications, a user interface module, an application launcher, and an operating system.)

The hearing aid daemon 1810 controls operations related to the hearing aid 1890. It controls the data that are sent to the hearing aid 1890 through the lower power wireless transceiver 1881. It also controls the data that are sent to other computing devices in the network through the network transceiver 1882. It also receives data from these transceivers and performs processes based on the received data. These processes includes processes for forming a peripheral group for the hearing aid, processes for pairing with the hearing aid by using pairing information, processes for determining whether to relinquish the paired connection with the hearing aid, processes for determining whether to request to pair with the hearing aid, and processes for handling hearing aid setting adjustments locally and remotely. For some embodiments, at least some of these processes are described by reference to FIGS. 3, 6, 8, 11, 12, and 16 above.

The hearing aid daemon 1810 also exchanges data with other components of the computing device 1801. The hearing aid daemon 1810 applies the hearing aid settings stored in the settings module 1820 to the hearing aid 1890. It also update the content of the settings module 1820 based on remote adjustment received over the network 1870 as well as those specified by user interface 1840. The hearing aid daemon 1810 receives data from applications 1830 and/or operating system 1860 as source of the media content that is to be provided to the hearing aid 1890.

In some embodiments, the hearing aid daemon 1810 causes the user interface 1840 to bring up a hearing aid control window when the user launches a hearing aid related application through the applications launcher 1850. In some embodiments, the hearing aid daemon 1810 identifies hearing aid related events at the pairing connection 1880 or at the network 1870 and prompts the user accordingly. For example, in some embodiments, the hearing aid daemon 1810 informs the user through the user interface 1840 that the computing device 1801 has automatically paired with the hearing aid 1890 and prompts the user for acceptance.

Figure 19:
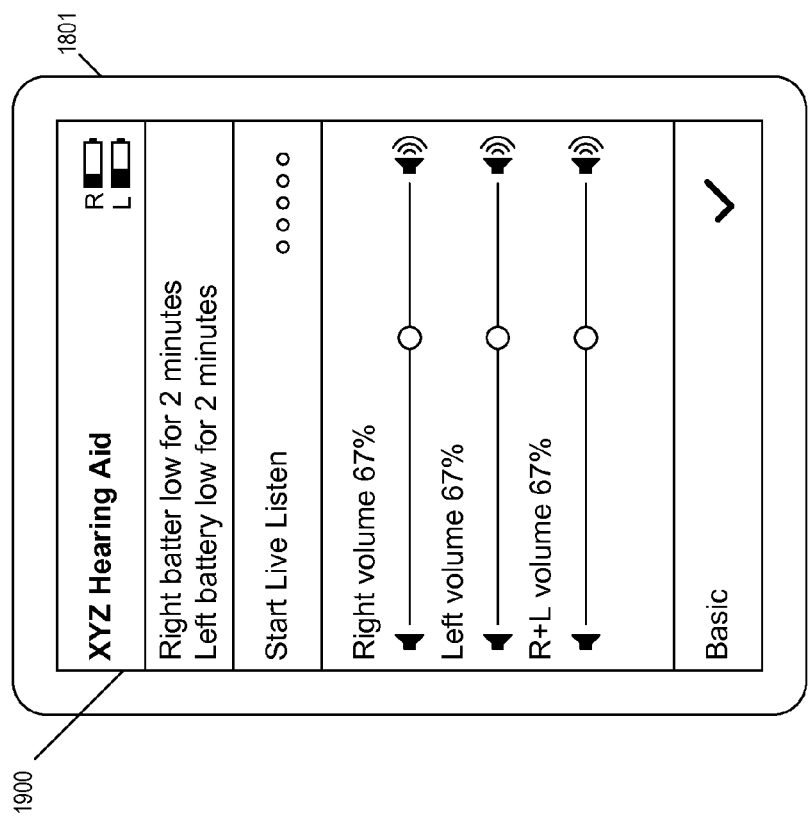
FIG. 19 illustrates an example hearing aid control window that is displayed to the user by a computing device.

FIG. 19 illustrates an example hearing aid control window 1900 that is displayed to the user by the computing device 1801 (or 1802). As illustrated, the hearing aid control window includes indications of battery life for left and right hearing aid. The hearing aid control window also includes sliders for controlling some of the settings of the hearing aid, such as left ear volume, right ear volume, and total volume. In some embodiments, the display of the hearing aid control sliders are synchronized between different computing devices (e.g., 1801 and 1802) as described by reference to FIG. 15 above, where host devices in a same peripheral group synchronize their control settings for the hearing aid by communicating with each other through the network.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
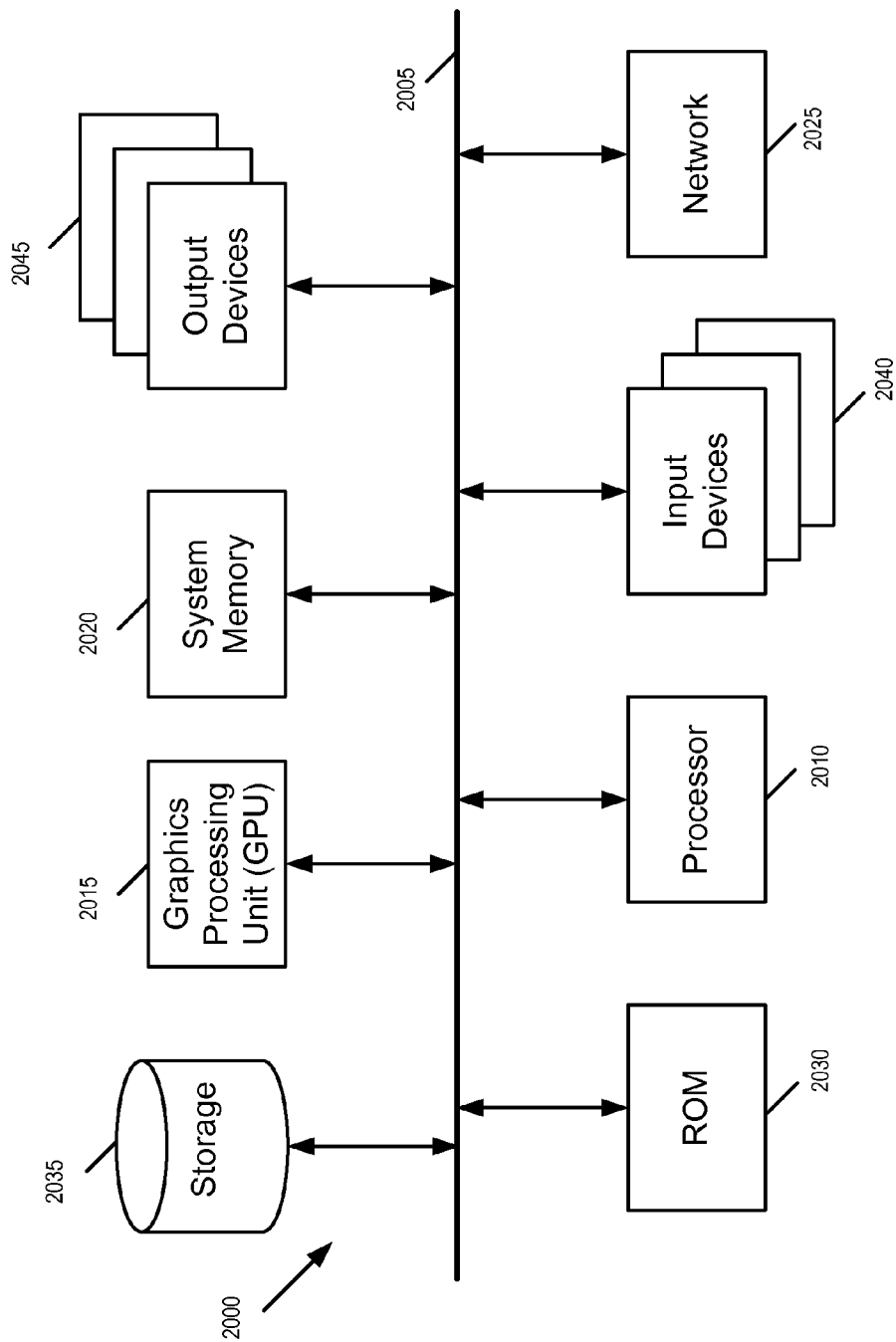
FIG. 20 conceptually illustrates an electronic system with which some embodiments of the invention are implemented.

FIG. 20 conceptually illustrates an electronic system 2000 with which some embodiments of the invention are implemented. The electronic system 2000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2000 includes a bus 2005, processing unit(s) 2010, a graphics processing unit (GPU) 2015, a system memory 2020, a network 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the GPU 2015, the system memory 2020, and the permanent storage device 2035.

From these various memory units, the processing unit(s) 2010 retrieves instructions to execute and data to process in order to execute the processes of the invention. The processing unit(s) may be a single processor or a multi-core processor in different embodiments. Some instructions are passed to and executed by the GPU 2015. The GPU 2015 can offload various computations or complement the image processing provided by the processing unit(s) 2010.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash memory device, etc., and its corresponding disk drive) as the permanent storage device. Like the permanent storage device 2035, the system memory 2020 is a read-and-write memory device. However, unlike storage device 2035, the system memory 2020 is a volatile read-and-write memory, such a random access memory. The system memory 2020 stores some of the instructions and data that the processor needs at runtime. In some embodiments, the invention's processes are stored in the system memory 2020, the permanent storage device 2035, and/or the read-only memory 2030. For example, the various memory units include instructions for processing multimedia clips in accordance with some embodiments. From these various memory units, the processing unit(s) 2010 retrieves instructions to execute and data to process in order to execute the processes of some embodiments.

The bus 2005 also connects to the input and output devices 2040 and 2045. The input devices 2040 enable the user to communicate information and select commands to the electronic system. The input devices 2040 include alphanumeric keyboards and pointing devices (also called "cursor control devices"), cameras (e.g., webcams), microphones or similar devices for receiving voice commands, etc. The output devices 2045 display images generated by the electronic system or otherwise output data. The output devices 2045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 20, bus 2005 also couples electronic system 2000 to a network 2025 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 6, 8, 11, 12, and 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory computer readable storage medium storing one or more programs, the one or more programs comprising instructions which, when executed by a first computing device, cause the first computing device to:
while the first computing device is directly paired with a peripheral device to enable direct wireless transmission of first media content from the first computing device to the peripheral device:
receive a first request from a second computing device to adjust a control setting of the peripheral device, the first request including a new control setting;
in response to receiving the first request to adjust the control setting of the peripheral device, apply the new control setting to the peripheral device;
receive a second request from the second computing device to cease direct pairing of the first computing device with the peripheral device;
provide pairing information used by the first computing device to directly pair with the peripheral device; and
in response to receiving the second request from the second computing device:
in accordance with a determination that second media content to be transmitted by the second computing device has a higher priority than first media content being transmitted by the first computing device: cease to directly pair with the peripheral device to allow the second computing device to directly pair with the peripheral device, using the pairing information that was used by the first computing device to directly pair with the peripheral device, to enable direct wireless transmission of the second media content from the second computing device to the peripheral device; and
in accordance with a determination that the second media content to be transmitted by the second computing device has a lower priority than the first media content being transmitted by the first computing device: continue to directly pair with the peripheral device, which prevents the second computing device from directly pairing with the peripheral device.

2. The computer readable storage medium of claim 1, wherein the pairing information enables the second computing device to pair with the peripheral device without performing discovery or inquiry with the peripheral device to obtain information that enables pairing with the peripheral device.

3. The computer readable storage medium of claim 1, wherein the pairing information is associated with a user account authenticated at the first computing device and the second computing device.

4. The computer readable storage medium of claim 3, wherein the first computing device uses the pairing information to pair with the peripheral device to supply media content to the peripheral device for the user account.

5. The computer readable storage medium of claim 1, wherein the peripheral device is configured to pair with only one of the first computing device and the second computing device at a time.

6. The computer readable storage medium of claim 1, wherein the second computing device is configured to provide environment specific parameters to the peripheral device.

7. The computer readable storage medium of claim 1, wherein the second computing device pairs with the peripheral device using a connection record concerning the pairing of the second computing device and the peripheral device, and wherein the connection record is specific to and only usable by the second computing device.

8. The computer readable storage medium of claim 1, wherein the pairing information includes at least one of: a peripheral device name and a peripheral device class.

9. The computer-readable storage medium of claim 1, wherein the one or more programs include instructions which, when executed by the first computing device, cause the first computing device to:
receive a peripheral interest request from the second computing device that includes data indicating that the second computing device is interested in the peripheral device; and
form a wireless network group with the second computing device in response to receiving the peripheral interest request.

10. A method, comprising:
at a first computing device:
while the first computing device is directly paired with a peripheral device to enable direct wireless transmission of first media content from the first computing device to the peripheral device:
receiving a first request from a second computing device to adjust a control setting of the peripheral device, the second request including a new control setting;
in response to receiving the first request to adjust the control setting of the peripheral device, applying the new control setting to the peripheral device;
receiving a second request from the second computing device to cease direct pairing of the first computing device with the peripheral device;
providing pairing information used by the first computing device to directly pair with the peripheral device; and
in response to receiving the second request from the second computing device:
in accordance with a determination that second media content to be transmitted by the second computing device has a higher priority than first media content being transmitted by the first computing device: ceasing to directly pair with the peripheral device to allow the second computing device to directly pair with the peripheral device, using the pairing information that was used by the first computing device to directly pair with the peripheral device, to enable direct wireless transmission of the second media content from the second computing device to the peripheral device; and
in accordance with a determination that the second media content to be transmitted by the second computing device has a lower priority than the first media content being transmitted by the first computing device: continuing to directly pair with the peripheral device, which prevents the second computing device from directly pairing with the peripheral device.

11. The method of claim 10, wherein the pairing information enables the second computing device to pair with the peripheral device without performing discovery or inquiry with the peripheral device to obtain information that enables pairing with the peripheral device.

12. The method of claim 10, wherein the pairing information is associated with a user account authenticated at the first computing device and the second computing device.

13. The method of claim 12, wherein the second computing device uses the pairing information to pair with the peripheral device to supply media content to the peripheral device for the user account.

14. The method of claim 10, wherein the peripheral device is configured to pair with only one of the first computing device and the second computing device at a time.

15. The method of claim 10, wherein the first computing device is configured to provide environment specific parameters to the peripheral device.

16. The method of claim 10, wherein the second computing device pairs with the peripheral device using a connection record concerning the pairing of the second computing device and the peripheral device, and wherein the connection record is specific to and only usable by the second computing device.

17. The method of claim 10, wherein the pairing information includes at least one of: a peripheral device name and a peripheral device class.

18. A first computing device, comprising:
a display;
one or more processors;
memory; and
one or more programs, wherein the one or more programs are stored in the memory and configured to be executed by the one or more processors, the one or more programs including instructions for:
while the first computing device is directly paired with a peripheral device to enable direct wireless transmission of first media content from the first computing device to the peripheral device:
receiving a first request from a second computing device to adjust a control setting of the peripheral device, the second request including a new control setting;
in response to receiving the first request to adjust the control setting of the peripheral device, applying the new control setting to the peripheral device;
receiving a second request from the second computing device to cease direct pairing of the first computing device with the peripheral device;
providing pairing information used by the first computing device to directly pair with the peripheral device; and
in response to receiving the second request from the second computing device:
in accordance with a determination that second media content to be transmitted by the second computing device has a higher priority than first media content being transmitted by the first computing device: ceasing to directly pair with the peripheral device to allow the second computing device to directly pair with the peripheral device, using the pairing information that was used by the first computing device to directly pair with the peripheral device, to enable direct wireless transmission of the second media content from the second computing device to the peripheral device; and
in accordance with a determination that the second media content to be transmitted by the second computing device has a lower priority than the first media content being transmitted by the first computing device: continuing to directly pair with the peripheral device, which prevents the second computing device from directly pairing with the peripheral device.

19. The first computing device of claim 18, wherein the pairing information enables the second computing device to pair with the peripheral device without performing discovery or inquiry with the peripheral device to obtain information that enables pairing with the peripheral device.

20. The first computing device of claim 18, wherein the pairing information is associated with a user account authenticated at the first computing device and the second computing device.

21. The first computing device of claim 20, wherein the second computing device uses the pairing information to pair with the peripheral device to supply media content to the peripheral device for the user account.

22. The first computing device of claim 18, wherein the peripheral device is configured to pair with only one of the first computing device and the second computing device at a time.

23. The first computing device of claim 18, wherein the first computing device is configured to provide environment specific parameters to the peripheral device.

24. The first computing device of claim 18, wherein the second computing device pairs with the peripheral device using a connection record concerning the pairing of the second computing device and the peripheral device, and wherein the connection record is specific to and only usable by the second computing device.

25. The first computing device of claim 18, wherein the pairing information includes at least one of: a peripheral device name and a peripheral device class.

26. A non-transitory computer readable storage medium storing one or more programs, the one or more programs comprising instructions which, when executed by a first computing device, cause the first computing device to:
while the first computing device is directly paired with a peripheral device to enable direct wireless transmission of first media content from the first computing device to the peripheral device:
receive a first request from the second computing device to adjust a control setting of the peripheral device, the first request including a new control setting;
in response to receiving the first request to adjust the control setting of the peripheral device, transmit the new control setting to a third computing device associated with the first computing device and the second computing device, the third computing device being separate and distinct from the first computing device and the second computing device;
receive a second request from the second computing device to cease direct pairing of the first computing device with the peripheral device;
provide pairing information used by the first computing device to directly pair with the peripheral device; and
in response to receiving the second request from the second computing device:
in accordance with a determination that second media content to be transmitted by the second computing device has a higher priority than first media content being transmitted by the first computing device: cease to directly pair with the peripheral device to allow the second computing device to directly pair with the peripheral device, using the pairing information that was used by the first computing device to directly pair with the peripheral device, to enable direct wireless transmission of the second media content from the second computing device to the peripheral device; and
in accordance with a determination that the second media content to be transmitted by the second computing device has a lower priority than the first media content being transmitted by the first computing device: continue to directly pair with the peripheral device, which prevents the second computing device from directly pairing with the peripheral device.

27. A non-transitory computer readable storage medium storing one or more programs, the one or more programs comprising instructions which, when executed by a first computing device, cause the first computing device to:
  while the first computing device is directly paired with a peripheral device to enable direct wireless transmission of first media content from the first computing device to the peripheral device:
    receive a first request from the second computing device to adjust a control setting of the peripheral device, the first request including a new control setting;
    in response to receiving the first request to adjust the control setting of the peripheral device, display the new control setting on a display of the first computing device
    receive a second request from the second computing device to cease direct pairing of the first computing device with the peripheral device;
  provide pairing information used by the first computing device to directly pair with the peripheral device; and
  in response to receiving the second request from the second computing device:
    in accordance with a determination that second media content to be transmitted by the second computing device has a higher priority than first media content being transmitted by the first computing device: cease to directly pair with the peripheral device to allow the second computing device to directly pair with the peripheral device, using the pairing information that was used by the first computing device to directly pair with the peripheral device, to enable direct wireless transmission of the second media content from the second computing device to the peripheral device; and
    in accordance with a determination that the second media content to be transmitted by the second computing device has a lower priority than the first media content being transmitted by the first computing device: continue to directly pair with the peripheral device, which prevents the second computing device from directly pairing with the peripheral device.

28. A first computing device, comprising:
  a display;
  one or more processors;
  memory; and
  one or more programs, wherein the one or more programs are stored in the memory and configured to be executed by the one or more processors, the one or more programs including instructions for:
    while the first computing device is directly paired with a peripheral device to enable direct wireless transmission of first media content from the first computing device to the peripheral device:
      receiving a first request from the second computing device to adjust a control setting of the peripheral device, the first request including a new control setting;
      in response to receiving the first request to adjust the control setting of the peripheral device, transmitting the new control setting to a third computing device associated with the first computing device and the second computing device, the third computing device being separate and distinct from the first computing device and the second computing device;
      receiving a second request from the second computing device to cease direct pairing of the first computing device with the peripheral device;
    providing pairing information used by the first computing device to directly pair with the peripheral device; and
    in response to receiving the second request from the second computing device:
      in accordance with a determination that second media content to be transmitted by the second computing device has a higher priority than first media content being transmitted by the first computing device: ceasing to directly pair with the peripheral device to allow the second computing device to directly pair with the peripheral device, using the pairing information that was used by the first computing device to directly pair with the peripheral device, to enable direct wireless transmission of the second media content from the second computing device to the peripheral device; and
      in accordance with a determination that the second media content to be transmitted by the second computing device has a lower priority than the first media content being transmitted by the first computing device: continuing to directly pair with the peripheral device, which prevents the second computing device from directly pairing with the peripheral device.

29. A method, comprising:
  at a first computing device:
    while the first computing device is directly paired with a peripheral device to enable direct wireless transmission of first media content from the first computing device to the peripheral device:
      receiving a first request from the second computing device to adjust a control setting of the peripheral device, the first request including a new control setting;
      in response to receiving the first request to adjust the control setting of the peripheral device, transmitting the new control setting to a third computing device associated with the first computing device and the second computing device, the third computing device being separate and distinct from the first computing device and the second computing device;
      receiving a second request from the second computing device to cease direct pairing of the first computing device with the peripheral device;
    providing pairing information used by the first computing device to directly pair with the peripheral device; and
    in response to receiving the second request from the second computing device:
      in accordance with a determination that second media content to be transmitted by the second computing device has a higher priority than first media content being transmitted by the first computing device: ceasing to directly pair with the peripheral device to allow the second computing device to directly pair with the peripheral device, using the pairing information that was used by the first computing device to directly pair with the peripheral device, to enable direct wireless transmission of the second media content from the second computing device to the peripheral device; and
      in accordance with a determination that the second media content to be transmitted by the second computing device has a lower priority than the first media content being transmitted by the first computing device: continuing to directly pair with the peripheral device, which prevents the second computing device from directly pairing with the peripheral device.

30. A first computing device, comprising:
a display;
one or more processors;
memory; and
one or more programs, wherein the one or more programs are stored in the memory and configured to be executed by the one or more processors, the one or more programs including instructions for:
while the first computing device is directly paired with a peripheral device to enable direct wireless transmission of first media content from the first computing device to the peripheral device:
receiving a first request from the second computing device to adjust a control setting of the peripheral device, the first request including a new control setting;
in response to receiving the first request to adjust the control setting of the peripheral device, displaying the new control setting on a display of the first computing device;
receiving a second request from the second computing device to cease direct pairing of the first computing device with the peripheral device;
providing pairing information used by the first computing device to directly pair with the peripheral device; and
in response to receiving the second request from the second computing device:
in accordance with a determination that second media content to be transmitted by the second computing device has a higher priority than first media content being transmitted by the first computing device: ceasing to directly pair with the peripheral device to allow the second computing device to directly pair with the peripheral device, using the pairing information that was used by the first computing device to directly pair with the peripheral device, to enable direct wireless transmission of the second media content from the second computing device to the peripheral device; and
in accordance with a determination that the second media content to be transmitted by the second computing device has a lower priority than the first media content being transmitted by the first computing device: continuing to directly pair with the peripheral device, which prevents the second computing device from directly pairing with the peripheral device.

31. A method, comprising:
at a first computing device:
while the first computing device is directly paired with a peripheral device to enable direct wireless transmission of first media content from the first computing device to the peripheral device:
receiving a first request from the second computing device to adjust a control setting of the peripheral device, the first request including a new control setting;
in response to receiving the first request to adjust the control setting of the peripheral device, displaying the new control setting on a display of the first computing device;
receiving a second request from the second computing device to cease direct pairing of the first computing device with the peripheral device;
providing pairing information used by the first computing device to directly pair with the peripheral device; and
in response to receiving the second request from the second computing device:
in accordance with a determination that second media content to be transmitted by the second computing device has a higher priority than first media content being transmitted by the first computing device: ceasing to directly pair with the peripheral device to allow the second computing device to directly pair with the peripheral device, using the pairing information that was used by the first computing device to directly pair with the peripheral device, to enable direct wireless transmission of the second media content from the second computing device to the peripheral device; and
in accordance with a determination that the second media content to be transmitted by the second computing device has a lower priority than the first media content being transmitted by the first computing device: continuing to directly pair with the peripheral device, which prevents the second computing device from directly pairing with the peripheral device.

* * * * *